(12) United States Patent
Bernhard et al.

(10) Patent No.: US 10,429,218 B2
(45) Date of Patent: Oct. 1, 2019

(54) MEASURING SYSTEM FOR MEASURING AT LEAST ONE MEASURED VARIABLE OF A FLUID AS WELL AS METHOD FOR OPERATING SUCH A MEASURING SYSTEM

(71) Applicant: Endress + Hauser Flowtec AG, Reinach (CH)

(72) Inventors: Holger Bernhard, Grenzach-Wyhlen (DE); Michael Lammbrigger, Basel (CH); Gebhard Gschwend, Allschwil (CH); Christian Matt, Reinach (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 251 days.

(21) Appl. No.: 15/518,515

(22) PCT Filed: Sep. 2, 2015

(86) PCT No.: PCT/EP2015/070020
§ 371 (c)(1),
(2) Date: Apr. 12, 2017

(87) PCT Pub. No.: WO2016/058745
PCT Pub. Date: Apr. 21, 2016

(65) Prior Publication Data
US 2017/0219398 A1    Aug. 3, 2017

(30) Foreign Application Priority Data

Oct. 17, 2014  (DE) .................. 10 2014 015 319
Mar. 5, 2015   (DE) .................. 10 2015 103 208

(51) Int. Cl.
*G01F 1/58*      (2006.01)
*G01F 15/00*     (2006.01)
(Continued)

(52) U.S. Cl.
CPC .............. *G01F 1/58* (2013.01); *G01F 1/66* (2013.01); *G01F 1/845* (2013.01); *G01F 1/8477* (2013.01);
(Continued)

(58) Field of Classification Search
CPC ....................................... G01F 1/58
(Continued)

(56) References Cited

U.S. PATENT DOCUMENTS

| 3,806,946 A | 4/1974 | Tiuri et al. |
| 2002/0100505 A1* | 8/2002 | Keilty ................. G05D 7/0688 137/487.5 |
| 2002/0183951 A1* | 12/2002 | Cunningham ........ G01F 1/8431 702/106 |

FOREIGN PATENT DOCUMENTS

| CN | 10 3765171 A | 4/2014 |
| DE | 102005057053 A1 | 5/2007 |

(Continued)

OTHER PUBLICATIONS

German Search Report, German Patent Office, Munich, DE, dated May 19, 2015.

(Continued)

*Primary Examiner* — Walter L Lindsay, Jr.
*Assistant Examiner* — Philipmarcus T Fadul
(74) *Attorney, Agent, or Firm* — Bacon & Thomas, PLLC

(57) ABSTRACT

A measuring system for measuring at least one measured variable of a flowing fluid, comprises a fluid supply line, a transducer apparatus, which has a tube and at least one other tube and is adapted to deliver at least one measurement signal corresponding to the at least one measured variable, a fluid return line, and a fluid withdrawal line. To open a first flow path, which leads from the lumen of the fluid supply line to the lumen of the tube, further to the lumen of the tube (Continued)

and further to the lumen of the fluid return line, equally as well not to the lumen of the fluid withdrawal line, and thereafter to allow fluid to flow along the flow path for the maintaining the temperature and/or for cleaning of parts of the measuring system and/or for conditioning fluid. It is, additionally, provided (instead of the first flow path) thereafter to open a second flow path, which leads from the lumen of the fluid supply line to the lumen of the first tube and, in parallel, to the lumen of the second tube and further from the lumen of the first tube, and from the lumen of the second tube, in each case, to the lumen of the fluid withdrawal line, as well as to allow fluid to flow along the second flow path. Moreover, it is provided, while allowing fluid to flow along the second flow path, in given cases, also while allowing fluid to flow along the first flow path, to generate at least one measurement signal, as well as to use the measurement signal for ascertaining measured values of the at least one measured variable.

57 Claims, 6 Drawing Sheets

(51) Int. Cl.
 *G01F 15/18* (2006.01)
 *G01F 1/84* (2006.01)
 *G01F 1/66* (2006.01)

(52) U.S. Cl.
 CPC .......... *G01F 1/8495* (2013.01); *G01F 15/005* (2013.01); *G01F 15/18* (2013.01)

(58) Field of Classification Search
 USPC ...................................................... 73/861.11
 See application file for complete search history.

(56) References Cited

FOREIGN PATENT DOCUMENTS

| DE | 102010063167 A1 | 6/2012 | |
|---|---|---|---|
| DE | 102014111644 A1 | 2/2016 | |
| EP | 1643221 B1 | 11/2007 | |
| EP | 2151699 A1 | 2/2010 | |
| WO | 00/11494 A1 | 3/2000 | |
| WO | WO-2008024112 A1 * | 2/2008 | ........... G01F 1/8413 |

OTHER PUBLICATIONS

International Search Report, EPO, The Netherlands, dated Oct. 9, 2015.
English Translation of the International Preliminary Report on Patentability, WIPO, Geneva, CH, dated Feb. 23, 2017.
Office Action dated Mar. 4, 2019, issued in corresponding Chinese Application No. 201580056497.1.

* cited by examiner

MEASURING SYSTEM FOR MEASURING AT LEAST ONE MEASURED VARIABLE OF A FLUID AS WELL AS METHOD FOR OPERATING SUCH A MEASURING SYSTEM

TECHNICAL FIELD

The invention relates, among other things, to a measuring system, for example, a measuring system embodied as a component of a transfer location for certification obligatory traffic in goods and serving for measuring at least one measured variable, for example, a mass flow rate, a total mass flow, a volume flow rate, a total volume flow, a density, a viscosity or a temperature, of a flowing fluid, for instance, a gas, a liquid or a dispersion. Additionally, the invention relates also to using the measuring system for ascertaining measured values for at least one measured variable, especially a mass flow rate, a total mass flow, a volume flow rate, a total volume flow, a density, a viscosity or a temperature, of a fluid to be transferred, for example, a liquefied gas containing methane and/or ethane and/or propane and/or butane and/or a liquefied natural gas (LNG). Furthermore, the invention relates to a method for operating, for example, for maintaining temperature and/or for cleaning, a measuring system serving for measuring at least one measured variable of a flowing fluid, especially a gas, a liquid or a dispersion.

BACKGROUND DISCUSSION

Known from Published International Patent Application, WO A 02/060805 is a measuring system for measuring at least one measured variable in such case, a mass flow rate, a total mass flow, a volume flow rate, or a volume flow of a flowing fluid, for example, a liquid or a gas. This measuring system serves, especially, as a transfer location for a fluid product, for example, a petroleum, a liquid fuel, a liquefied gas or the like, and is formed by means of a fluid supply line connected to a supply container, for example, a tank, containing fluid, by means of a fluid return line connected to the supply container, by means of a control apparatus connected to the fluid return line for establishing or interrupting different flow paths of the measuring system, by means of a transducer apparatus for generating at least one electrical measurement signal corresponding to the at least one measured variable, an electrical measurement signal having at least one signal parameter dependent on the measured variable, or reacting to a change of the measured variable with a change of the signal parameter, as well as by means of a fluid withdrawal line.

The transducer apparatus—embodied in such case as a component of a vibronic measuring transducer serving for generating two measurement signals having a phase angle dependent on the mass flow rate and a signal frequency dependent on the density of the fluid—comprises a first tube and a second tube. The two tubes are connected permanently for parallel flow via an inlet-side line branch as well as an outlet-side line junction and are, in such case, additionally adapted to be flowed through simultaneously by fluid during operation of the measuring system and while such flow is occurring to be cause to vibrate for the purpose of generating the measurement signals.

The control apparatus—in such case formed by means of a check valve as a well as a return valve having two switch positions—is provided selectively to create a first flow path leading from the lumen of the fluid supply line to the lumen of the first tube of the transducer apparatus and, in parallel, to the lumen of the second tube of the transducer apparatus and further from the lumen of the first tube and from the lumen of the second tube, in each case, to the lumen of the fluid return line, equally as well not to the lumen of the fluid withdrawal line, in such a manner that, of fluid allowed to flow along the first flow path, a volume portion flows through the lumen of the first tube further to the lumen of the fluid withdrawal line and at the same time another volume portion flows through the lumen of the second tube further to the lumen of the fluid return line, or, selectively, a second flow path leading from the lumen of the fluid supply line to the lumen of the first tube of the transducer apparatus and, in parallel, to the lumen of the second tube of the transducer apparatus and further from the lumen of the first tube, and from the lumen of the second tube, in each case, to the lumen of the fluid withdrawal line, equally as a well not to the lumen of the fluid return line, in such a manner that of fluid allowed to flow along the second flow path a volume portion flows through the lumen of the first tube further to the lumen of the fluid withdrawal line and at the same time another volume portion flows through the lumen of the second tube further to the lumen of the fluid withdrawal line. The first flow path begins and ends, in each case, in the supply container and serves here especially as recirculation system for preventing impurities within a volume portion of the fluid ultimately to be filled via the second flow path into an appropriate withdrawal container, for example, a tank of a tank truck. For conveying fluid along the first flow path and along the second flow path, the measuring system includes, furthermore, a corresponding transport pump. Additionally, the measuring system comprises electrically coupled with the transducer apparatus a measuring- and operating electronics, which is adapted to process the at least one measurement signal, to ascertain by means of the at least one measurement signal the measured values for the at least one measured variable, as well as electrically coupled with the control apparatus a control electronics, which is adapted to deliver control signals operating the control apparatus, for example, control signals carrying control commands effecting the setting of the first flow path and the second flow path. The measuring- and operating electronics and the control electronics are components of one and the same device electronics of a conventional Coriolis mass flow measuring device or Coriolis mass flow/density measuring device formed together with the transducer apparatus and can accordingly also be accommodated in a single, shared, protective housing.

For filling a predetermined (or predeterminable) volume or a predetermined (or predeterminable) mass of fluid into the withdrawal container in the case of the measuring system shown in WO A 02/060805, the control apparatus, first of all, sets the transport pump in motion and thereafter opens the first flow path, so that, as a result, the fluid flows, first of all, from the supply container via the fluid supply line further through the tubes of the transducer system further to the fluid return line and from there back into the supply container. At the same time, the measuring- and operating electronics, based on the measurement signals generated concurrently by means of the transducer system, measures a density of the fluid flowing along the first flow path, in order to detect whether the fluid is composed of one or more phases, consequently in order to detect whether, or to what extent, the supplied fluid contains undesired impurities, or does not yet meet a relevant predetermined quality requirement or specification. If the measuring- and operating electronics detects, based on the measured density, that a single phase, or pure, fluid is flowing in the transducer system, consequently in the first flow path, this is correspondingly transmitted to the control electronics and then the control electronics outputs corresponding commands to the control apparatus, commands effecting the interrupting of the first flow path and the opening of the second flow path. Essentially at the same time, the measuring- and operating electronics, supplementally to measuring the density of the flowing fluid, starts measuring a (mass-) flow of fluid allowed to flow in the second flow path, in order so to ascertain an amount of the fluid allowed to flow via the second flow path, ultimately output via the fluid withdrawal line and correspondingly filled into the withdrawal container. A measuring system comparable as regards construction and operation of the above described measuring system, having both an openable first flow path as well as also a second flow path openable (alternatively) thereto, and serving for transferring fluid—in such case a cryogenic, consequently extremely cold, liquid is shown, for example, also in Published International Patent Application, WO A 2014/151829.

To be viewed as quite problematic in a conventional measuring system of the above indicated type is that the transducer apparatus and the control system are so embodied and arranged that downstream of the transducer apparatus components of the control system are arranged, in such case the return valve, which can act as a line branch for fluid flowing through the transducer apparatus actually in the direction of the fluid withdrawal line, with the consequence that, in the case of a possible, first of all, in given cases, also unrecognized, defect of the control system and/or the control electronics, the amount of fluid (evidently) measured by means of the transducer apparatus and the measuring—and operating electronics and allowed to flow along the second flow path can deviate significantly from the amount of the second fluid actually allowed to flow along the total second flow path, consequently along the fluid withdrawal line, and from the amount of fluid actually filled into the withdrawal container. Such a defect of the measuring system can be, for example, that a command for starting the measuring of the flow is produced erroneously by the measuring—and operating electronics or also by the control electronics, without that also corresponding commands, commands both opening the second flow path as well as also effecting interrupting the first flow path are output by the control electronics, or that the control electronics, indeed, correctly generates and outputs all commands for the control system, however, they are not immediately and/or not faultlessly performed by the control system, for instance, due to a defect of the return valve. An especially critical defect of the measuring system would be, for example, a not completely blocking return valve in one or both switch positions, consequently a return valve allowing leakage flow amounts of the fluid into the supposedly blocked flow path. Resulting therefrom, such measuring systems can, at times, also be rejected for use for traffic in goods where certification is obligatory or only be permitted after implementation of additional, costly measures for detection or reporting of the above referenced defects.

SUMMARY OF THE INVENTION

Starting from the above indicated state of the art and the disadvantages inherent therein, an object of the invention is to provide a method and a measuring system, in the case of which, even in the case of possible failure of the control electronics and/or the control system, a faulty measurement of the flow amount actually allowed via the fluid withdrawal line and actually output into a connected withdrawal container can be largely prevented, and, indeed, even while maintaining a positioning of the transducer apparatus upstream of the fluid withdrawal line.

For achieving the object, the invention resides in a measuring system embodied, for example as a component of a transfer location for traffic in goods where certification is obligatory, for measuring at least one measured variable—, for example, a mass flow rate, a total mass flow, a volume flow rate, a total volume flow, a density, a viscosity or a temperature—of a flowing fluid, for example, a fluid to be transferred into a withdrawal container in a predetermined amount, —, for example, a fluid in the form of a gas, a liquid or a dispersion. The measuring system of the invention comprises:

a fluid supply line, for example, a fluid supply line formed by means of a metal tube and/or connected to a supply container containing fluid, wherein the fluid supply line has an open first line end, an open second line end and a lumen extending from the first line end to the second line end;

a transducer apparatus, which has a first tube, for example, a first metal tube, with an open first tube end, an open second tube end and a lumen extending from the first tube end to the second tube end and at least a second tube, for example, a second tube constructed equally to the first tube, for example, a second metal tube, with an open first tube end, an open second tube end and a lumen extending from the first tube end to the second tube end, wherein the transducer apparatus is adapted to deliver at least one measurement signal, for example, an electrical measurement signal, corresponding to the at least one measured variable and having at least one signal parameter dependent on the measured variable, for example, a signal level dependent on the measured variable, a signal frequency dependent on the measured variable and/or a phase angle dependent on the measured variable, or reacting to a change of the measured variable with a change of the signal parameter;

a fluid return line, for example, a fluid return line formed by means of a metal tube, with an open first line end, an open second line end and a lumen extending from the first line end to the second line end;

a fluid withdrawal line, for example, a fluid withdrawal line formed by means of a metal tube, with an open first line end, an open second line end and a lumen extending from the first line end to the second line end;

as well as a control apparatus, for example, a control apparatus connected to both the fluid supply line as well as also the fluid return line as well as the fluid withdrawal line, for opening or interrupting flow paths involving both the lumen of the first tube as well as also the lumen of the second tube.

In the case of the measuring system of the invention, the control apparatus is additionally embodied to provide a first flow path leading from the lumen of the fluid supply line to the lumen of the first tube of the transducer apparatus, further to the lumen of the second tube of the transducer apparatus and further to the lumen of the fluid return line, equally as well not to the lumen of the fluid withdrawal line, and the control apparatus is embodied to provide a second flow path leading from the lumen of the fluid supply line to the lumen of the first tube of the transducer apparatus and, in parallel, to the lumen of the second tube of the transducer apparatus and further from the lumen of the first tube and from the lumen of the second tube, in each case, to the lumen of the fluid withdrawal line.

Furthermore, the invention relates also to using an aforementioned measuring system for ascertaining measured values for at least one measured variable—, for example, a mass flow rate, a total mass flow, a volume flow rate, a total volume flow, a density, a viscosity or a temperature—of a fluid to be transferred, for example, a liquefied gas, for example, a methane and/or ethane and/or propane and/or butane containing, liquefied gas and/or a liquefied natural gas (LNG).

Moreover, the invention resides in a method for operating—, for example, for maintaining temperature and/or for cleaning a measuring system serving for measuring at least one measured variable—, for example, a mass flow rate, a total mass flow, a volume flow rate, a total volume flow, a density, a viscosity or a temperature—of a flowing fluid, for example, a fluid to be transferred in a predetermined amount into a withdrawal container, —a fluid such as e.g. a gas, a liquid or a dispersion—, for example, a measuring system adapted to serve as component of a transfer location for traffic in goods where certification is obligatory, for example, a measuring system for conditioning a fluid to be transferred. In such case, it is especially provided that the measuring system comprises a fluid supply line, for example, a fluid supply line formed by means of a metal tube and/or connected to a supply container containing fluid, wherein the fluid supply line has an open first line end, an open second line end and a lumen extending from the first line end to the second line end, a transducer apparatus, which has a first tube with an open first tube end, an open second tube end and a lumen extending from the first tube end to the second tube end and at least a second tube, for example, a second tube constructed equally to the first tube, wherein the second tube has an open first tube end, an open second tube end and a lumen extending from the first tube end to the second tube end, wherein the transducer apparatus is adapted to deliver at least one measurement signal, for example, an electrical measurement signal, corresponding to the at least one measured variable and having at least one signal parameter dependent on the measured variable, for example, a signal level dependent on the measured variable, a signal frequency dependent on the measured variable and/or a phase angle dependent on the measured variable, or reacting to a change of the measured variable with a change of the signal parameter, a fluid return line, for example, a fluid return line formed by means of a metal tube, with an open first line end, an open second line end and a lumen extending from the first line end to the second line end, and a fluid withdrawal line, for example, a fluid withdrawal line formed by means of a metal tube, with an open first line end, an open second line end and a lumen extending from the first line end to the second line end.

The method of the invention especially comprises:

opening a first flow path, which leads from the lumen of the fluid supply line to the lumen of the first tube, further to the lumen of the second tube and further to the lumen of the fluid return line, equally as well not to the lumen of the fluid withdrawal line;

allowing fluid to flow along the first flow path in such a manner that a volume portion of the fluid flows, first of all, through the lumen of the first tube, further through the lumen of the second tube and, only thereafter, further to the lumen of the fluid return line;

opening a second flow path, which leads from the lumen of the fluid supply line to the lumen of the first tube and, in parallel, to the lumen of the second tube and further from the lumen of the first tube and from the lumen of the second tube, in each case, to the lumen of the fluid withdrawal line;

allowing fluid to flow along the second flow path in such a manner that a volume portion of the fluid flows through the lumen of the first tube further to the lumen of the fluid withdrawal line and at the same time another volume portion of the fluid flows through the lumen of the second tube further to the lumen of the fluid withdrawal line;

generating the at least one measurement signal during the allowing of the fluid to flow along the second flow path, for example, also during the allowing of the fluid to flow along the first flow path; and using the at least one measurement signal for ascertaining measured values for the at least one measured variable, for example, in such a manner that a sequence of the measured values represents the at least one measured variable of the fluid flowing along the second flow path as a function of time.

In a first embodiment of the measuring system of the invention, the control apparatus is additionally embodied to open the first flow path in such a manner that, of fluid allowed to flow along the first flow path, a volume portion flows, first of all, from the first tube end of the first tube in the direction toward its second tube end through the lumen of the first tube, then from the second tube end of the second tube in the direction toward its first tube end through the lumen of the second tube and, only thereafter, further to the lumen of the fluid return line.

In a second embodiment of the measuring system of the invention, the control apparatus is additionally embodied to open the second flow path in such a manner that, of fluid allowed to flow along the second flow path, a volume portion flows from the first tube end of the first tube in the direction toward its second tube end through the lumen of the first tube further to the lumen of the fluid withdrawal line and at the same time another volume portion flows from the first tube end of the second tube in the direction toward its second tube end through the lumen of the second tube further to the lumen of the fluid withdrawal line.

In a third embodiment of the measuring system of the invention, it is provided that the transducer apparatus is a component of a measuring transducer, especially a vibronic measuring transducer, serving for generating at least one measurement signal corresponding to the at least one measured variable.

In a fourth embodiment of the measuring system of the invention, it is provided that the transducer apparatus forms a measuring transducer, for example, a vibronic or a magneto-inductive, measuring transducer, serving for generating at least one measurement signal corresponding to the at least one measured variables.

In a fifth embodiment of the measuring system of the invention, it is provided that at least the fluid allowed to flow through the second flow path contains methane and/or ethane and/or propane and/or butane.

In a sixth embodiment of the measuring system of the invention, it is provided that at least the fluid allowed to flow through the second flow path is a liquefied gas, for example, a methane, ethane, propane and/or butane containing, liquefied gas and/or a liquefied natural gas (LNG).

In a seventh embodiment of the measuring system of the invention, it is provided that the fluid allowed to flow through the second flow path corresponds to the fluid allowed to flow through the first flow path.

In an eighth embodiment of the measuring system of the invention, it is provided that the fluid allowed to flow through the second flow path has a temperature, which equals a temperature of the fluid allowed to flow through the first flow path.

In a ninth embodiment of the measuring system of the invention, it is provided that the fluid has, at least at times, for example, both during flow through the first flow path as well as also during flow through the second flow path, a temperature of less than −40° C.

In a tenth embodiment of the measuring system of the invention, it is provided that the fluid has, at least at times, for example, both during flow through the first flow path as well as also during flow through the second flow path, a temperature of greater than 100° C.

In an 11th embodiment of the measuring system of the invention, it is provided that fluid allowed to flow through the second flow path has, at least at times, a temperature, which equals a temperature of the fluid allowed to flow through the first flow path.

In a first further development of the measuring system of the invention, it is provided that the control apparatus further comprises a line branch, for example, a line branch formed by means of a T-piece, with a lumen, for example, a T- or Y-shaped lumen, having a first flow opening as well as also a second flow opening as well as a third flow opening.

In a first embodiment of the first further development of the measuring system of the invention, it is, furthermore, provided that the line branch is connected to the second line end of the fluid supply line, for example, by means of a flange connection, in such a manner that the lumen of the line branch communicates via the first flow opening with the lumen of the fluid supply line.

In a second embodiment of the first further development of the measuring system of the invention, it is, furthermore, provided that the line branch is connected to the first tube end of the first tube, for example, by means of a flange connection, in such a manner that the lumen of the line branch communicates via the second flow opening with the lumen of the first tube.

In a third embodiment of the first further development of the measuring system of the invention, it is, furthermore, provided that the line branch has a connecting flange surrounding its first flow opening.

In a fourth embodiment of the first further development of the measuring system of the invention, it is, additionally, provided that the line branch has a connecting flange surrounding its second flow opening.

In a fifth embodiment of the first further development of the measuring system of the invention, it is, additionally, provided that the line branch has a connecting flange surrounding its third flow opening.

In a second further development of the measuring system of the invention, it is provided that the control apparatus further comprises a first switch element having at least two different switch positions, for example, a first switch element formed by means of at least one two-way valve, with a first connection, a second connection and a third connection, and adapted, in a first switch position, to provide and to open a first flow duct leading from the first connection, for example, only, to the second connection, and adapted, in a second switch position, to provide and to open a second flow duct leading from the third connection, for example, only, to the first connection, for example, also to block the first flow duct, for example, in such a manner that the first flow duct forms a subsection of the first flow path, respectively that the second flow duct forms a subsection of the second flow path.

In a first embodiment of the second further development of the measuring system of the invention, it is, additionally, provided that the control apparatus further comprises a line branch, for example, a line branch formed by means of a T-piece, with a lumen having a first flow opening as well as also a second flow opening as well as a third flow opening, for example, a T- or Y-shaped lumen, and that the first switch element is connected, for example, with the third connection, to the line branch, for example, its third flow opening and/or by means of a flange connection, for example, in such a manner that the second flow duct of the first switch element, to the extent that it is provided, and opened, communicates with the lumen of the line branch.

In a second embodiment of the second further development of the measuring system of the invention, it is, additionally, provided that the first switch element is connected, for example, with the first connection, to the first tube end of the second tube, for example, by means of a flange connection, for example, in such a manner that the first flow duct of the first switch element, to the extent that it is provided and opened, communicates with the lumen of the second tube, and that the second flow duct of the first switch element, to the extent that it is provided and opened, communicates with the lumen of the second tube and/or it is, additionally, provided that the first switch element is connected, for example, with the second connection, to the first tube end of the fluid return line, for example, by means of a flange connection, for example, in such a manner that the first flow duct of the first switch element, to the extent that it is provided and opened, communicates with the lumen of the fluid return line.

In a third further development of the measuring system of the invention, it is provided that the control apparatus further comprises a second switch element having at least two different switch positions, for example, a second switch element formed by means of at least one shut-off valve, with a first connection and a second connection, wherein the second switch element is adapted, in a first switch position, to provide and to open a flow duct leading from the first connection to the second connection—, for example, in such a manner that the flow duct of the second switch element forms a subsection of the second flow path—, and wherein the second switch element is adapted, in a second switch position, to block the flow duct, thus, for example, to provide and to open no flow duct.

In a first embodiment of the third further development of the measuring system of the invention, it is, additionally, provided that the second switch element is connected, for example, with the second connection, to the first tube end of the fluid-withdrawal line, for example, by means of a flange connection, for example, in such a manner that the flow duct of the second switch element, to the extent that it is provided and opened, communicates with the lumen of the fluid withdrawal line.

In a second embodiment of the third further development of the measuring system of the invention, it is, additionally, provided that the control apparatus further comprises a line junction with a lumen having a first flow opening of the line junction as well as also a second flow opening of the line junction as well as a third flow opening of the line junction, for example, a circularly cylindrical lumen, and that the second switch element is connected, for example, with the first connection, to the line junction, for example, by means of a flange connection, for example, in such a manner that the flow duct, to the extent that it is provided and opened, communicates via the first flow opening with the lumen of the line junction.

In a fourth further development of the measuring system of the invention, it is provided that the control apparatus further comprises a line junction with a lumen communicating with a first flow opening of the line junction as well as also with a second flow opening of the line junction as well as with a third flow opening of the line junction, for example, a circularly cylindrical lumen.

In a first embodiment of the fourth further development of the measuring system of the invention, it is, additionally, provided that the line junction is connected both to the second tube end of the first tube as well as also to the second tube end of the second tube, for example, by means of welded connection or by means of soldered or brazed connection, in such a manner that the lumen of the line junction communicates via the first flow opening with the lumen of the first tube and via the second flow opening with the lumen of the second tube.

In a second embodiment of the fourth further development of the measuring system of the invention, it is, additionally, provided that the line junction has a connecting flange surrounding its third flow opening.

In a third embodiment of the fourth further development of the measuring system of the invention, it is, additionally, provided that both the transducer apparatus as well as also the line junction are components of one and the same measuring transducer, for example, a vibronic measuring transducer, serving for generating at least one measurement signal corresponding to the at least one measured variable.

In a fifth further development of the measuring system of the invention, such further comprises a supply container, for example, a supply container formed by means of a tank, with a lumen filled at least partially with the fluid having, for example, a temperature of less than −40° C. or a temperature of greater than 100° C.

In a first embodiment of the fifth further development of the measuring system of the invention, it is, additionally, provided that the fluid supply line is connected to the supply container.

In a second embodiment of the fifth further development of the measuring system of the invention, it is, additionally, provided that the fluid return line is connected to the supply container.

In a sixth further development of the measuring system of the invention, such further comprises a transport pump, which is adapted to drive fluid along the first flow path and/or along the second flow path.

In a seventh further development of the measuring system of the invention, such further comprises at least one measuring- and operating electronics electrically coupled with the transducer apparatus and adapted to process at least one measurement signal.

In a first embodiment of the seventh further development of the measuring system of the invention, it is, additionally, provided that the measuring- and operating electronics is adapted to ascertain by means of the at least one measurement signal the measured values for the at least one measured variable, for example, measured values representing a mass flow rate or a total mass flow of the fluid allowed to flow along the second flow path or measured values representing a volume flow rate or a total volume flow of the fluid allowed to flow along the second flow path.

In a second embodiment of the seventh further development of the measuring system of the invention, it is, additionally, provided that the measuring system comprises at least one temperature sensor thermally coupled with the first tube and adapted to register a temperature of the tube and to transduce such into an auxiliary measurement signal, for example, an electrical, auxiliary measurement signal, representing the temperature and having at least one signal parameter dependent on the temperature, for example, a signal level dependent on the temperature, or reacting to a change of the temperature of the first tube with a change of the signal parameter, and that the measuring- and operating electronics is adapted to process the at least one auxiliary measurement signal, for example, to ascertain by means of the at least one auxiliary measurement signal the measured values for the at least one measured variable and/or measured values for the temperature of the first tube, e.g. an operating temperature of the transducer apparatus.

In a third embodiment of the seventh further development of the measuring system, such further comprises a control electronics electrically coupled with the control apparatus and adapted to generate and to output control signals operating the control apparatus, for example, control signals carrying control commands effecting the opening of the first flow path or the second flow path, as well as a data connection, for example, a data connection established by means of data cable and/or based on radio waves, for transferring to the control electronics measured values ascertained by the measuring- and operating electronics and/or for transferring to the measuring- and operating electronics control commands generated by the control electronics. Furthermore, the measuring- and operating electronics as well as the control electronics can here also be adapted to communicate with one another, for example, via fieldbus and/or via radio connection, for example, to transmit to the control electronics measured values ascertained by the measuring- and operating electronics, or to the measuring- and operating electronics control commands generated by the control electronics.

In an eighth further development of the measuring system of the invention, such further comprises a withdrawal container arranged downstream from the fluid withdrawal line, for example, a mobile withdrawal container and/or one temporarily connected to the fluid withdrawal line.

In a ninth further development of the measuring system of the invention, such further comprises at least one temperature sensor thermally coupled with the first tube and adapted to register a temperature of the tube and to transduce such into an auxiliary measurement signal, for example, an electrical, auxiliary measurement signal, representing the temperature and having at least one signal parameter dependent on the temperature, for example, a signal level dependent on the temperature, respectively reacting to a change of the temperature of the first tube with a change of the signal parameter.

In a tenth further development of the measuring system of the invention, such further comprises a control electronics electrically coupled with the control apparatus and adapted to generate and to output control signals operating the control apparatus, for example, control signals carrying control commands effecting the opening of the first flow path or the second flow path.

In a first embodiment of the method of the invention, it is provided that the allowing of fluid to flow along the first flow path comprises allowing a volume portion of the fluid to flow from the first tube end of the first tube in the direction of its second tube end through the lumen of the first tube and allowing the volume portion of the fluid to continue to flow from the second tube end of the second tube in the direction of its first tube end through the lumen of the second tube.

In a second embodiment of the method of the invention, it is provided that the allowing of fluid to flow along the first flow path serves for maintaining the temperature of the transducer apparatus.

In a third embodiment of the method of the invention, it is provided that the allowing of fluid to flow along the first flow path serves for the at least partial cleaning of the measuring system, especially for cleaning the transducer apparatus and/or the fluid supply line.

In a fourth embodiment of the method of the invention, it is provided that the allowing of fluid to flow along the first flow path serves for conditioning the fluid.

In a fifth embodiment of the method of the invention, it is provided that the allowing of fluid to flow along the second flow path comprises allowing a volume portion of the fluid to flow from the first tube end of the first tube in the direction of its second tube end through the lumen of the first tube as well as simultaneously allowing another volume portion of the fluid to flow from the first tube end of the second tube in the direction of its second tube end through the lumen of the second tube.

In a sixth embodiment of the method of the invention, it is provided that the opening of the second flow path includes an interrupting of the first flow path.

In a seventh embodiment of the method of the invention, it is provided that the opening of the first flow path includes an interrupting of the second flow path.

In an eighth embodiment of the method of the invention, it is provided that the second flow path does not lead to the lumen of the fluid return line.

In a ninth embodiment of the method of the invention, it is provided that the measuring system further comprises a line branch, for example, a line branch formed by means of a T-piece, with a lumen having a first flow opening as well as also a second flow opening as well as a third flow opening, for example, a T- or Y-shaped lumen. Furthermore, it is provided that the opening of the first flow path includes a closing, for example, a pressure tight or hermetic closing, or blocking of the third flow opening of the line branch, and/or that the opening of the second flow path includes an opening of the third flow opening of the line branch; this, especially, for the case, in which the line branch is connected to the second line end of the fluid supply line—, for example, by means of a flange connection—, in such a manner that the lumen of the line branch communicates via the first flow opening with the lumen of the fluid supply line, and/or that the line branch is connected to the first tube end of the first tube—, for example, by means of a flange connection—, in such a manner that the lumen of the line branch communicates via the second flow opening with the lumen of the first tube.

In a tenth embodiment of the method of the invention, it is provided that the measuring system further comprises a line junction with a lumen having a first flow opening as well as also a second flow opening as well as a third flow opening, especially a circularly cylindrical lumen. Furthermore, it is provided that the line junction is connected both to the second tube end of the first tube as well as also to the second tube end of the second tube, for example, by means of welded connection or by means of soldered or brazed connection, in such a manner that the lumen of the line junction communicates via the first flow opening with the lumen of the first tube and via the second flow opening with the lumen of the second tube, and/or that the opening of the first flow path includes a closing, for example, a pressure tight or hermetic closing, or a blocking of the third flow opening of the line junction, and/or that the opening of the second flow path includes an opening of the third flow opening of the line junction.

In an 11th embodiment of the method of the invention, it is provided that the measuring system further comprises a supply container, for example, a supply container formed by means of a tank and/or a mobile supply container, with a lumen at least partially filled with the fluid. Developing this embodiment of the invention further, it is, additionally, provided that the opening of the first flow path includes connecting the lumen of the supply container with the lumen of the fluid supply line, in such a manner that the first flow path leads from the lumen of the supply container further to the lumen of the fluid supply line, and/or that the opening of the first flow path includes connecting the lumen of the fluid return line with the lumen of the supply container, in such a manner that the first flow path leads from the lumen of the fluid return line further to the lumen of the supply container, and/or that the opening of the second flow path includes connecting the lumen of the supply container with the lumen of the fluid supply line, in such a manner that the second flow path leads from the lumen of the supply container further to the lumen of the fluid supply line.

In a twelfth embodiment of the method of the invention, it is provided that the measuring system further comprises a measuring—and operating electronics electrically coupled with the transducer apparatus.

In a 13th embodiment of the method of the invention, it is provided that the measuring system further comprises a measuring- and operating electronics electrically coupled with the transducer apparatus and adapted to process at least one measurement signal, especially to ascertain by means of the at least one measurement signal the measured values for the at least one measured variable. Developing this embodiment of the invention further, it is, additionally, provided to generate the at least one measurement signal during the allowing of the fluid to flow along the first flow path and to use such for ascertaining the signal parameter of the at least one measurement signal and/or for ascertaining a (scale-) zero-point of the measuring system corresponding to the signal parameter of the at least one measurement signal, for example, for calibrating the measuring—and operating electronics, respectively for adjusting the measuring—and operating electronics, in such a manner that, as a result, a measurement error, a deviation between the at least one measured variable and a measured value ascertained therefor, lies within a predetermined tolerance range.

In a 14th embodiment of the method of the invention, it is provided that the opening of the second flow path occurs after a temperature difference is ascertained between an operating temperature of the transducer apparatus, for example, a temperature of the first tube and/or second tube, and the fluid temperature, a temperature of the fluid—, for example, fluid present in a supply container—, which temperature difference lies within a predetermined tolerance range, for example, a tolerance range representing a steady thermal equilibrium state of the transducer apparatus or of the measuring system.

In a 15th embodiment of the method of the invention, it is provided that the opening of the second flow path occurs after a predetermined amount of fluid has flowed along the first flow path and/or after fluid has flowed for a predetermined duration along the first flow path flow.

In a 16th embodiment of the method of the invention, it is provided that the transducer apparatus is adapted to deliver at least one auxiliary measurement signal, for example, an electrical, auxiliary measurement signal, corresponding to an operating temperature of the transducer apparatus—, for example, a temperature of the first tube and/or a temperature of the second tube—, i.e. an auxiliary measurement signal having at least one signal parameter dependent on the operating temperature, for example, a signal level dependent on the operating temperature, or reacting to a change of the operating temperature with a change of the signal parameter.

In a 17th embodiment of the method of the invention, it is provided that a step of generating the at least one measurement signal comprises steps of effecting mechanical oscillations of the first tube and/or second tube, for example, mechanical oscillations both of the first tube and also of the second tube, and registering oscillatory movements of the first and/or second tube.

In an 18th embodiment of the method of the invention, it is provided that the transducer apparatus further comprises at least one oscillation exciter for exciting, for example, differentially exciting, and maintaining mechanical oscillations of the first tube and/or second tube, for example, mechanical oscillations both of the first tube and also of the second tube.

In a 19th embodiment of the method of the invention, it is provided that the transducer apparatus further comprises at least one oscillation exciter for exciting, for example, differentially exciting, and maintaining mechanical oscillations of the first tube and/or second tube, for example, mechanical oscillations both of the first tube and also of the second tube, and the method further comprises using the at least one oscillation exciter for exciting and maintaining mechanical oscillations of the first tube and/or second tube, for example, mechanical oscillations both of the first tube and also of the second tube.

In a 20th embodiment of the method of the invention, it is provided that the transducer apparatus further comprises: at least one oscillation sensor for registering oscillatory movements of the first tube and/or second tube—, for example, for differentially registering oscillatory movements both of the first tube and also of the second tube—and for generating a sensor signal serving as a measurement signal or as a basis for a measurement signal.

In a 21st embodiment of the method of the invention, it is provided that the transducer apparatus is a component of a vibronic measuring device, for example, a Coriolis mass flow measuring device, a density measuring device or a viscosity measuring device.

In a 22nd embodiment of the method of the invention, it is provided that the at least one measured variable is a mass flow rate of the fluid allowed to flow through the measuring system or a measured variable derived therefrom, for example, a total mass of the fluid allowed to flow through the transducer system and/or along the second flow path during a predetermined time interval.

In a 23rd embodiment of the method of the invention, it is provided that at least the fluid allowed to flow through the second flow path contains methane and/or ethane and/or propane and/or butane.

In a 24th embodiment of the method of the invention, it is provided that at least the fluid allowed to flow through the second flow path is a liquefied gas, for example, a methane, ethane, propane and/or butane containing, liquefied gas and/or a liquefied natural gas (LNG).

In a 25th embodiment of the method of the invention, it is provided that the fluid allowed to flow through the second flow path (II) corresponds to the fluid allowed to flow through the first flow path.

In a 26th embodiment of the method of the invention, it is provided that the fluid allowed to flow through the second flow path has a temperature, which equals a temperature of the fluid allowed to flow through the first flow path (I).

In a 27th embodiment of the method of the invention, it is provided that the fluid has, at least at times, for example, both during flow through the first flow path as well as also during flow through the second flow path, a temperature of less than −40° C.

In a 28th embodiment of the method of the invention, it is provided that the fluid has, at least at times, for example, both during flow through the first flow path as well as also during flow through the second flow path, a temperature of greater than 100° C.

In a 29th embodiment of the method of the invention, it is provided that fluid allowed to flow through the second flow path has at least at times a temperature, which equals a temperature of the fluid allowed to flow through the first flow path.

In a 30th embodiment of the method of the invention, it is provided that the measuring system further comprises: a withdrawal container arranged downstream of the fluid withdrawal line, for example, a mobile withdrawal container and/or a withdrawal container temporarily connected to the fluid withdrawal line. Especially, it is provided, in such case, furthermore, that the opening of the second flow path comprises a connecting of the withdrawal container to the fluid withdrawal line, in such a manner that the second flow path leads from the lumen of the fluid withdrawal line to a lumen of the withdrawal container.

In a 31st embodiment of the method of the invention, it is provided that the measuring system is a component of a transfer location, for example, a transfer location for traffic in goods where certification is obligatory, which is adapted to transfer into a withdrawal container arranged downstream of the fluid withdrawal line, for example, a mobile withdrawal container and/or a withdrawal container temporarily connected to the fluid withdrawal line, a predetermined or predeterminable amount of the fluid, especially fluid held in a supply container and/or a fluid having a temperature of less than −40° C.

In a first further development of the method of the invention, such further comprises:
 generating the at least one measurement signal while allowing fluid to flow along the first flow path; and
 using the at least one measurement signal for ascertaining the signal parameter of the at least one measurement signal and/or for ascertaining a (scale-) zero-point of the measuring system corresponding to the signal parameter of the at least one measurement signal.

In a second further development of the method of the invention, such further comprises: ascertaining an operating temperature of the transducer apparatus, for example, a temperature of the first tube and/or second tube.

In a third further development of the method of the invention, such further comprises: ascertaining a temperature of the fluid, especially fluid held in a supply container.

In a fourth further development of the method of the invention, such further comprises: ascertaining, especially while allowing fluid to flow along the first flow path, a temperature difference existing between an operating temperature of the transducer apparatus, especially a temperature of the first tube and/or second tube, and a fluid temperature, i.e. a temperature of the fluid, especially fluid held in a supply container.

In a fifth further development of the method of the invention, such further comprises: using the at least one auxiliary measurement signal, for example, one delivered while allowing fluid to flow along the first flow path, for ascertaining measured values of the operating temperature of the transducer apparatus, for example, in such a manner that a sequence of the measured values represents the operating temperature of the transducer apparatus as a function of time.

In a sixth further development of the method of the invention, such further comprises: ascertaining at least one measured value of a fluid temperature, a temperature, for example, of fluid held in a supply container or guided in the fluid supply line.

In a seventh further development of the method of the invention, such further comprises: ascertaining at least one measured value of a fluid temperature, a temperature, for example, of fluid held in a supply container or guided in the fluid supply line, as well as ascertaining an operating temperature of the transducer apparatus, for example, a temperature of the first tube and/or second tube. Furthermore, it is, in such case, provided to compare at least one of the measured values of the operating temperature of the transducer apparatus with the at least one measured value of the fluid temperature—ascertained, for example, while allowing fluid to flow along the first flow path—as well as to open the second flow path only after, by comparing the at least one of the measured values of the operating temperature of the transducer apparatus with the at least one measured value of the fluid temperature, it is ascertained that a temperature difference existing between the operating temperature of the transducer apparatus and the fluid temperature lies within a predetermined tolerance range, for example, a tolerance range representing a steady thermal equilibrium state of the transducer apparatus.

In an eighth further development of the method of the invention, such further comprises: using the at least one measurement signal for ascertaining measured values of the at least one other (second) measured variable differing from the at least one (first) measured variable, for example, in such a manner that a sequence of the measured values represents the additional measured variable as a function of time for the fluid flowing along the first flow path and/or that a sequence of the measured values represents the additional measured variable as a function of time for the fluid flowing along the second flow path. The at least one additional (second) measured variable can be, for example, a density of the fluid.

A basic idea of the invention in the case of a measuring system of the type being discussed, and a method put into practice therewith, is to provide a first flow path and a second flow path different from the first, and to open such flow paths selectively, in such a manner that the fluid allowed to flow along the second flow path—in contrast to conventional measuring systems of the type being discussed and methods put into practice therewith, as known from the state of the art is not able in equal manner to flow through the transducer system, such as is the case for fluid allowed to flow along the first flow path, in such a manner that in the case of opened first flow path a volume portion of the fluid is caused to flow, first of all, through the lumen of the first tube, further through the lumen of the second tube and, only thereafter, further to the lumen of the fluid return line, and that in the case of opened second flow path a volume portion of the fluid is caused to flow through the lumen of the first tube further to the lumen of the fluid withdrawal line and at the same time another volume portion of the fluid is caused to flow through the lumen of the second tube further to the lumen of the fluid withdrawal line. In other words, thus, in the case of the measuring system and method of the invention, the first flow path contains a series circuit of the at least two tubes of the transducer system and the second flow path a parallel circuit of the at least two tubes of the transducer system. Due to an arrangement of the components lastly forming the first and second flow paths of the measuring system in the manner indicated above, it is possible, on the one hand, to prevent line branches downstream of the transducer system. On the other hand, thus, it is, however, also possible to achieve that the measurement signals generated by means of the transducer system are already indicative of the instantaneously actually opened flow path. Thus, by means of the measuring and operating electronics, the instantaneously actually installed flow path can be recognized and it can be assured that in the case of, first of all, unrecognized, wrongly arranged flow path the measuring and operating electronics based on the measurement signals nevertheless only measures the amount actually taken via the fluid withdrawal line. Transducer systems suitable for generating measurement signals indexing the respective flow paths, and suitable for balancing independent fluid flows in two or more tubes, consequently for correct balancing of the amount of fluid actually supplied along the second flow path using measuring devices formed of transducer system and measuring and operating electronics are known, for example, from USA 2006/0016273, U.S. Pat. No. 4,781,068, and Published International Patent Applications, WO A 00/04344 or WO A 2004/017027 or WO A 2008/013545. In the case of the therein disclosed transducer systems, as well as also in the case of the above discussed WO A 02/060805, in each case, of concern is a measuring transducer of vibration-type as transducer system, in the case of which the tubes are caused to vibrate during operation for the purpose of generating Coriolis forces dependent on a mass flow rate of the fluid flowing through the respective tubes, and inertial forces dependent on a density of the fluid guided in the tubes. A vibronic measuring device formed therewith can accordingly be embodied, for example, as a Coriolis mass flow measuring device, or as a Coriolis mass flow density measuring device. In the case of the measuring system of the invention, serving for forming the transducer apparatus can be, besides the above discussed measuring transducers of vibration-type, however, also other measuring transducers, and skids formed therewith, likewise established in industrial measurements technology based on other measurement principles, for example, conventional magneto inductive measuring transducers, vortex sensors and/or ultrasonic transducers, and conventional magneto inductive flow measuring devices, vortex flow measuring devices, and ultrasonic flow measuring devices formed therewith. Measuring transducers, and measuring devices, of the above-mentioned type, i.e. Coriolis mass flow measuring devices, Coriolis mass flow density measuring devices, magneto inductive flow measuring devices, vortex flow measuring devices, pressure difference flow measuring devices, respectively ultrasonic, flow measuring devices, etc., are described at length and in detail, in, among others, also in European Patent, EP A 2 568 262, USA 2004/0187599, USA 2007/0124090, USA 2008/0127745, USA 2009/0049926, USA 2014/0123742, U.S. Pat. Nos. 5,247,838, 5,402,685, 5,557,051, 5,583,300, 6,058,787, and Published International Patent Applications, WO A 2004/029559, WO A 2010/099276, WO A 2014/029484 or WO A 88/02476 and are manufactured and sold by numerous manufacturers, not least of all also by the applicant, for example, also by the firm Endress+Hauser Measurements Technology GmbH+Co. KG under the trademarks and designations, PROMAG W, PROMASS 84A, PROMASS 84F, PROMASS 84X, CNGMass, LPG-Mass, LNGMass, PROWIRL D 200, PROWIRL F 200, PROWIRL O 200, PROWIRL R 200, PROSONIC FLOW B 200, PROSONIC FLOW 92F, PROSONIC FLOW 93C, DELTATOP D063C, DELTATOP D069S, DELTATOP DP61D (http://www.de.endress.com/de/produkte-feldinstrumentierung/Durchflussmessung-Produktubersicht) (translated: http://www.de.endress.com/de/products-field instrumentation/flow measurement-product review).

Another advantage of the invention is that after the opening of the first flow path, alternatively or in supplementation to the previously indicated cleaning of the fluid, also a cleaning of the tubes of the transducer system and of other components of the measuring system forming the first flow path is directly implementable, for example, in the course of a cleaning- and/or disinfection measure (CIP, SIP), in that selectively appropriate cleaning- and/or sterilization fluids, for example, superheated steam, respectively corresponding rinsing liquids, such as e.g. acids or deionized water (≤0.1 µS/cm at 25° C.), can be led through the measuring system along the first flow path. Moreover, with the measuring system of the invention and the method of the invention in advantageous manner also an, at times, required temperature maintenance of the transducer apparatus, an equalizing of an operating temperature of the transducer system to a fluid temperature, a temperature of the fluid to be filled via the second flow path, can be directly performed by allowing the fluid to flow through the first flow path until an essentially stationary thermal equilibrium state of the transducer apparatus is achieved. Such a temperature regulation of the transducer system can, for example, be indicated and even be required, in order to prevent abrupt changes of the fluid temperature, particularly changes of the fluid temperature accompanying transient temperature distributions within the transducer apparatus, particularly time fluctuations of the operating temperature of the transducer apparatus while allowing fluid to flow through the second flow path, particularly during the measuring of the at least one measured variable, for instance, in order to prevent the disadvantageous effects discussed in US-A 2004/0187599, US-A 2006/0112774, US-A 2008/0127745, US-A 2011/0192234, and US-A 2014/0060154, of such fluctuations of the operating temperature of the transducer apparatus on the accuracy of measurement of the measuring system, with which the measured variable can be ultimately measured. Such fluctuations of the operating temperature of the transducer apparatus as a function of time, consequently such lessened measurement accuracies, are, for example, to be compensated, when the fluid to be transferred by means of the measuring system has an extremely low temperature amounting, for example, to less than −40 C, or an extremely high temperature, for example, amounting to more than 100 C, consequently a fluid temperature deviating mentionably from normal room-, or ambient, temperature.

A further advantage of the invention is, furthermore, that it is comparatively universally applicable, for example, for different fluids, for different measured variables, and/or also for different types of transfer locations, for example, stations serving for the fueling of motor vehicles, watercraft, or airplanes or also transfer plants serving for loading and unloading of mobile transport containers, for example, installed on ships, railcars or trucks.

BRIEF DESCRIPTION OF THE DRAWINGS

The invention as well as advantageous embodiments thereof will now be explained in greater detail based on examples of embodiments, which are shown in the figures of the drawing. Equal, i.e. equally acting or equally functioning, parts are provided in all figures with equal reference characters; when perspicuity requires or it otherwise appears sensible, already used reference characters are omitted in subsequent figures. Other advantageous embodiments or further developments, especially also combinations, of, firstly, only individually explained aspects of the invention, result, furthermore, from the figures of the drawing and/or from the claims per se.

In particular, the figures of the drawing show as follows.

DETAILED DISCUSSION IN CONJUNCTION WITH THE DRAWINGS

Figure 1:
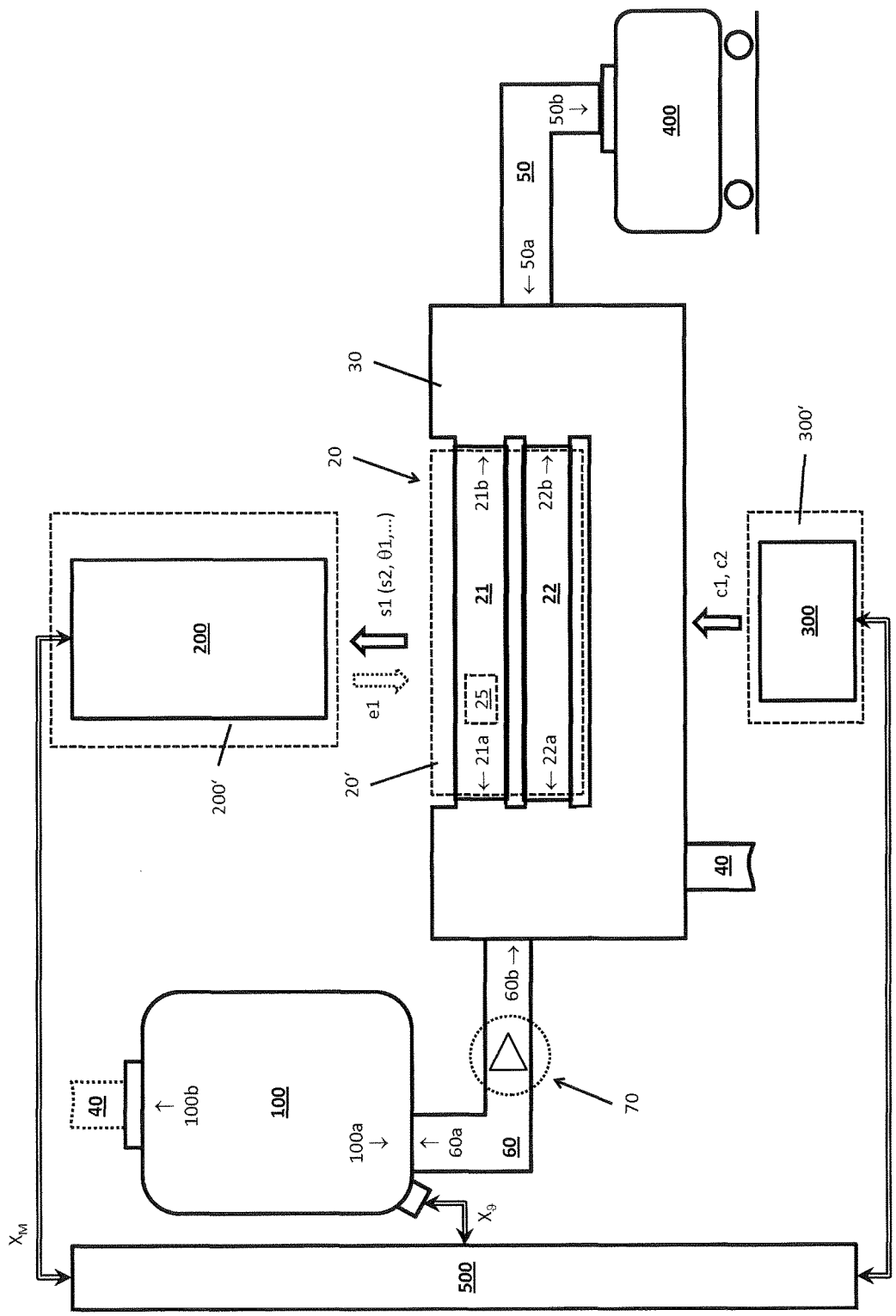
FIG. 1 is a measuring system for measuring at least one measured variable of a flowing fluid.

FIG. 1 shows an example of an embodiment for a measuring system adapted and provided for measuring at least one measured variable of a flowing fluid, for example, a gas, a liquid or a dispersion. The at least one measured variable can be, for example, a flow velocity, a mass flow rate rn, a total mass flow, a volume flow rate $\dot{v}$, a total volume flow or also some other fluid dynamic, measured variable. The measured variable can, however, also be, for example, a material characteristic qualifying the fluid, such as e.g. a density $\rho$ or a viscosity $\eta$ of the fluid, or even a thermodynamic measured variable representing a thermodynamic state of the fluid, such as e.g. a pressure reigning in the fluid or a temperature $\vartheta$ of the fluid. In an embodiment of the invention, the measuring system is used for ascertaining measured values of the at least one measured variable—, for example, thus a mass flow rate, a total mass flow, a volume flow rate, a total volume flow, a density, a viscosity or a temperature—of a fluid to be transferred, for example, to be transferred in a predetermined or predeterminable amount from a supplier to a customer, e.g. to be filled into a withdrawal container temporarily installed in the measuring system. The fluid can, in such case, also be, for example, a liquefied gas, especially a methane and/or ethane and/or propane and/or butane containing, liquefied gas, or a liquefied natural gas (LNG), or also a mixed substance formed by means of liquid hydrocarbons, for example, a petroleum or a liquid fuel. The measuring system can accordingly, for example, also be embodied as a component of a transfer location for traffic in goods where certification is obligatory, such as, for instance, a filling plant, and/or as a component of a transfer location in the manner of the transfer locations shown in Published International Patent Applications, WO-A 02/060805, WO-A 2008/013545, WO-A 2010/099276 and WO-A 2014/151829.

The measuring system comprises therefor a transducer apparatus 20, which is provided and adapted to deliver at least one measurement signal s1, for example, an electrical or optical, measurement signal s1, corresponding to the at least one measured variable and having at least one signal parameter dependent on the measured variable, or reacting to a change of the measured variable with a change of the signal parameter. The signal parameter dependent on the measured variable can be, for example, a signal level dependent on the measured variable, a signal frequency dependent on the measured variable and/or a phase angle dependent on the measured variable. For guiding the fluid, the transducer apparatus 20 includes, such as shown schematically in FIG. 1, a first tube 21 with an open first tube end 21a, an open second tube end 21b as well as at least one lumen extending from the first tube end to the second tube end and a second tube 22, for example, a second tube constructed equally to the first tube, with an open first tube end 22a, an open second tube end 22b and a lumen extending from the first tube end to the second tube end. Each of the at least two tubes 21, 22 of the transducer system can be manufactured, for example, of a metal, for example, titanium, tantalum, zirconium, or an alloy manufactured by means of at least one of these metals, a stainless steel or a nickel based alloy. The transducer system can—such as quite usual for industrial measuring—and automation technology—in advantageous manner be accommodated in a transducer-protective housing 20', e.g. one of a metal and/or a plastic, especially also one sealed against water spray and/or dust and/or explosion resistant and/or serving as a (second) safety envelope, for example, in such a manner that each of the two tubes with its respective two tube ends extends on both sides from the transducer-protective housing to sit, in each case, in a connecting flange provided at respective ends of the transducer-protective housing.

Figure 2B:
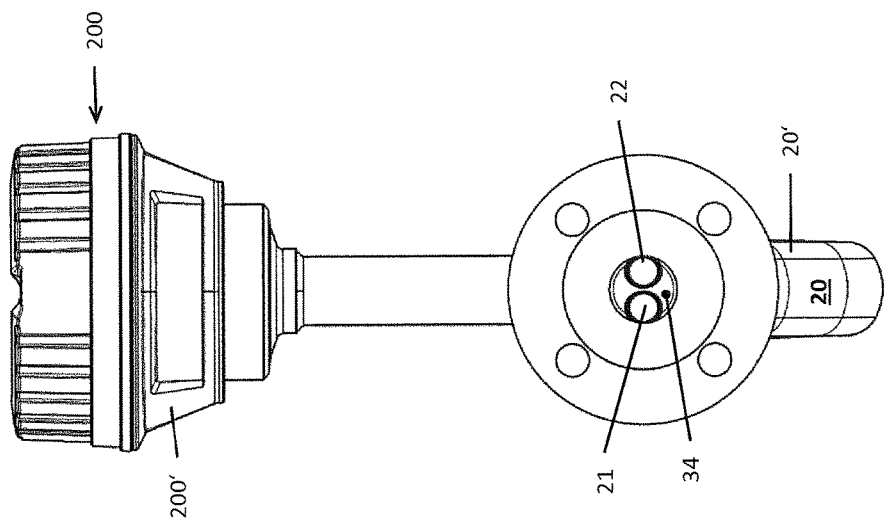
FIGS. 2a and 2b are different exterior views of a transducer apparatus suitable for a measuring system of FIG. 1.
Figure 2A:
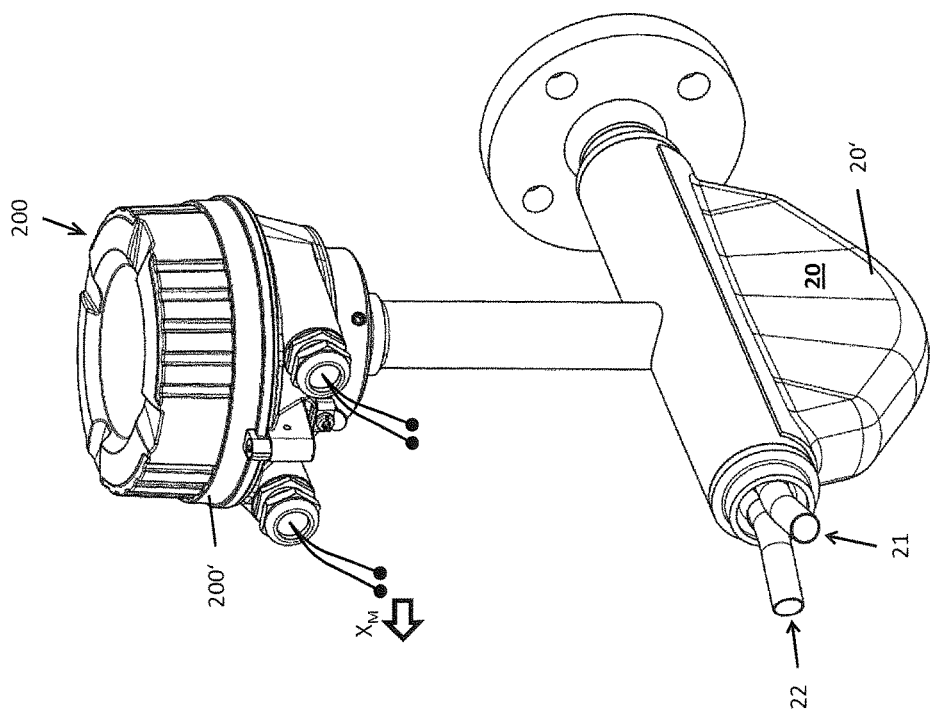
Figure 3B:
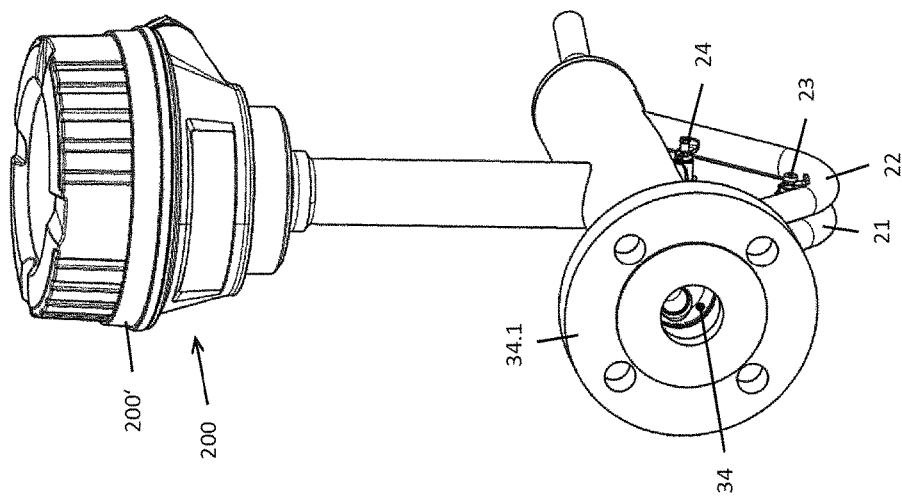
FIGS. 3a and 3b are different views, a variant of a transducer apparatus suitable for a measuring system of FIG. 1.
Figure 3A:
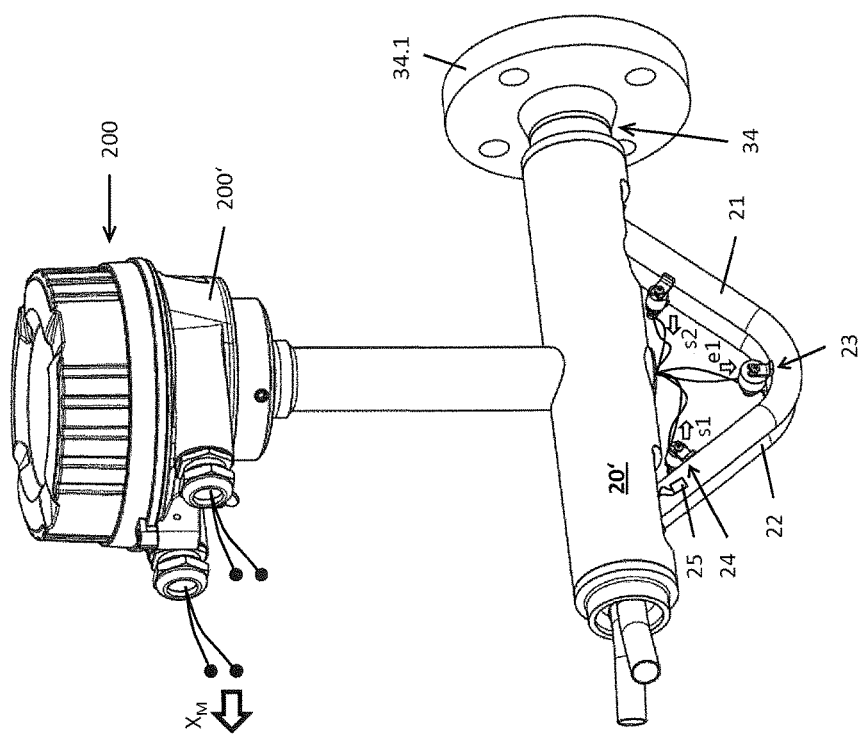

In an additional embodiment of the invention, the transducer apparatus is, as well as also shown schematically in FIGS. 2a and 2b—a component of a self-sufficient measuring device, or formed by means of one or more self-sufficient measuring devices, serving for generating at least one measurement signal corresponding to the at least one measured variable. The transducer apparatus 20 can accordingly be formed, for example, by means of two conventional magneto-inductive flow measuring devices, by means of two conventional ultrasound flow measuring devices, by means of two vortex flow measuring devices or also by means of two conventional pressure difference, flow measuring devices, or by their respective measuring transducers. The transducer apparatus can, however, be, for example, also a component of a vibronic measuring device, especially a Coriolis mass flow measuring device, a density measuring device or viscosity measuring device, or, for forming the transducer apparatus, for example, also a conventional vibronic measuring transducer can serve, for instance, also one of the kinds of measuring transducers disclosed in US-A 2010/0050783 or in US-A 2006/0016273, U.S. Pat. No. 4,781,068, and Published International Patent Applications, WO-A 00/04344 or WO-A 2004/017027 or WO-A 2008/013545. An example of such a vibronic measuring transducer is shown in FIGS. 3a and 3b.

Accordingly, the transducer apparatus further comprises according to an additional embodiment of the invention at least one oscillation exciter 23 for the exciting, especially differential exciting, and maintaining of mechanical oscillations of the first tube 21 and/or of the second tube 22, especially mechanical oscillations both of the first tube 21 as well as of the second tube 22. Furthermore, it is provided during operation of the measuring system to use the oscillation exciter for exciting and maintaining mechanical oscillations of the first tube 21 and/or of the second tube 22, especially mechanical oscillations both of the first tube and also of the second tube. For registering oscillatory movements of the tubes 21 and 22, the transducer system 20 formed by means of a vibronic measuring transducer—especially for the differential registering of oscillatory movements both of the first tube 21 as well as also of the second tube 22—as well as for generating a sensor signal serving as measurement signal s1, respectively serving as basis for the measurement signal s1, comprises, according to an additional embodiment of the invention, furthermore, at least one oscillation sensor 24. Especially, in such case, the generating of the at least one measurement signal thus comprises also an effecting of mechanical oscillations of the tube 21, respectively 22, as well as a registering of oscillatory movements, especially opposite equal, oscillatory movements, of the tubes 21 and 22.

For processing the at least one measurement signal s1, for example, for ascertaining measured values of the at least one measured variable by means of the at least one measurement signal, the measuring system comprises according to an additional embodiment of the invention additionally at least one measuring- and operating electronics 200 electrically coupled with the transducer apparatus. For the previously indicated case, in which the transducer apparatus 20 is formed by means of a vibronic measuring transducer, or is a component of a vibronic measuring device, furthermore, both the oscillation exciter 23 as well as also the oscillation sensor 24 are electrically connected to the measuring- and operating electronics 200. Furthermore, the measuring- and operating electronics 200 is, according to an additional embodiment of the invention, also adapted to deliver a driver signal el supplying electrical power into the transducer system, which driver signal serves in the aforementioned case especially to supply the oscillation exciter 23 with electrical power to be converted into oscillatory movements of the tubes 21 and 22. The measuring- and operating electronics can—such as quite usual for electronics of this type—are accommodated in advantageous manner additionally in an electronics-protective housing 200', e.g. of a metal and/or a synthetic material, especially an electronics-protective housing also sealed against water spray and/or dust and/or explosion resistant. The electronics-protective housing 200' with measuring- and operating electronics 200 arranged therein can—such as quite usual for industrial measuring- and automation technology—additionally be mounted on the transducer-protective housing, in order to form a measuring device of compact construction, for example, also a prefabricated and self-sufficient measuring device. For displaying ascertained measured values for the at least one measured variable on-site, the measuring- and operating electronics 200 can have, furthermore, a display-element (HMI), for example, a screen (LCD, TFT, OLED) manufactured by means of thin layer transistors.

Furthermore, the measuring system comprises—, such as shown also in FIG. 1—a fluid supply line 60, especially a fluid supply line formed by means of a metal tube and/or a fluid supply line connected to a fluid storing, supply container. Fluid supply line 60 has an open, first line end 60a, an open, second line end 60b and a lumen extending from the first line end to the second line end. The measuring system further comprises a fluid return line 40, especially a fluid return line formed by means of a metal tube, with an open first line end 40a, an open second line end 40b and a lumen extending from the first line end to the second line end, as well as a fluid withdrawal line 50, especially a fluid withdrawal line formed by means of a metal tube, with an open first line end 50*a*, an open second line end 50*b* and a lumen extending from the first line end to the second line end.

In a further embodiment of the invention, it is, additionally, provided that the measuring system comprises a supply container 100, e.g. a supply container formed by means of a—mobile or stationary—tank. The lumen of the supply container is at least partially filled with the fluid. Supply container 100 is, in an additional embodiment of the invention, furthermore, provided and adapted to hold in its lumen the fluid with a temperature of less than −40° C., or to hold the fluid for a predeterminable length of time at a temperature of less than −40° C. In another embodiment of the invention, the supply container 100 is provided and adapted to hold in its lumen the fluid with a temperature of greater than 100° C., or to hold the fluid for a predeterminable length of time at a temperature of greater than 100° C. Supply container 100 can, accordingly, for example, also be encased with thermally insulating material and/or be actively cooled or actively heated by means of a corresponding temperature maintenance apparatus, for example, a cooling plant or a steam plant. As indicated in FIG. 1, the fluid supply line 60 can be directly connected to the supply container 100, for example, a corresponding withdrawal opening 100*a* of the supply container 100, in such a manner that the lumen of the fluid supply line 60 communicates via line end 60*a* with the lumen of the supply container 100. Moreover, it can additionally be advantageous also to connect the fluid return line 40 with the second line end of the supply container 100, for example, a corresponding fill opening 100*b* of the supply container 100, in such a manner that the lumen of fluid return line 40 also communicates with the lumen of the supply container 100, consequently fluid allowed to flow through the fluid return line 40 can be led back into the supply container 100.

Particularly for the the case, in which the measuring system is embodied as a component of a transfer location, which serves to transfer fluid from a supplier to a customer, the measuring system according to an additional embodiment of the invention further comprises a withdrawal container 400 arranged downstream of the fluid withdrawal line 50, for example, a withdrawal container only temporarily connected to the fluid withdrawal line, or a mobile withdrawal container.

Figure 4:
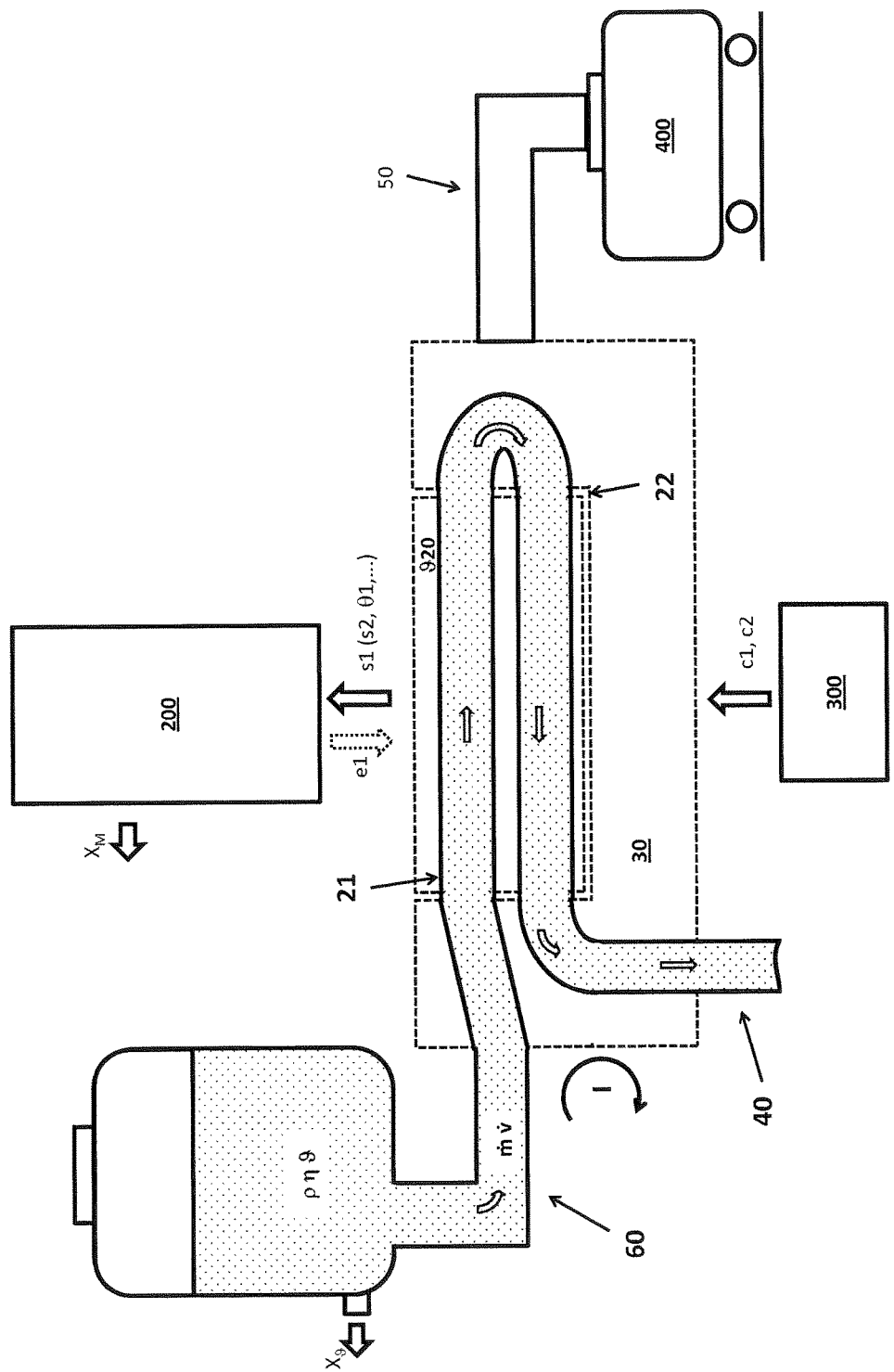
FIG. 4 is a first flow path opened by means of a measuring system according to FIG. 1.

According to the invention, it is, furthermore, provided, in the operation of the measuring system, at times—for example, in the course of a start-up or in the course of a restarting after a preceding resting phase or in the course of a cleaning measure applied to the measuring system—to open a first flow path (I), which—such as shown schematically in FIG. 4, or as directly evident from a combination of FIGS. 1 and 4—leads from the lumen of the fluid supply line 60 to the lumen of the first tube 21, further to the lumen of the second tube and further to the lumen of the fluid return line, equally as well not to the lumen of the fluid withdrawal line 50, and thereafter to allow fluid to flow along the first flow path (I), in such a manner that a volume portion of the fluid, first of all, flows through the lumen of the first tube 21, further through the lumen of the second tube 22 of the transducer system and, only thereafter, further to the lumen of the fluid return line 40. Furthermore, it is provided at times—, for example, for the purpose of transferring fluid from the supply container arranged upstream of the fluid supply line 60 to the withdrawal container 400 arranged downstream of the fluid withdrawal line 50—to open a second flow path (II), which—such as shown schematically in FIG. 5, or as directly evident from a combination of FIGS. 1 and 5—leads from the lumen of the fluid supply line 60 to the lumen of the first tube 21 of the transducer system 20 and, in parallel, to the lumen of the second tube and further from the lumen of the first tube 21, respectively from the lumen of the second tube 22, in each case, to the lumen of the fluid withdrawal line 50, and thereafter to allow fluid to flow along the second flow path (II), in such a manner that a volume portion of the fluid flows through the lumen of the first tube 21 further to the lumen of the fluid withdrawal line 50 and at the same time another volume portion of the fluid flows through the lumen of the second tube 22 of the transducer system further to the lumen of the fluid withdrawal line 50. Furthermore, according to an additional embodiment of the invention, it is provided to open the second flow path (II) in such a manner that—, as well as also indicated in FIG. 5—it does not lead to the lumen of the fluid return line.

Figure 5:
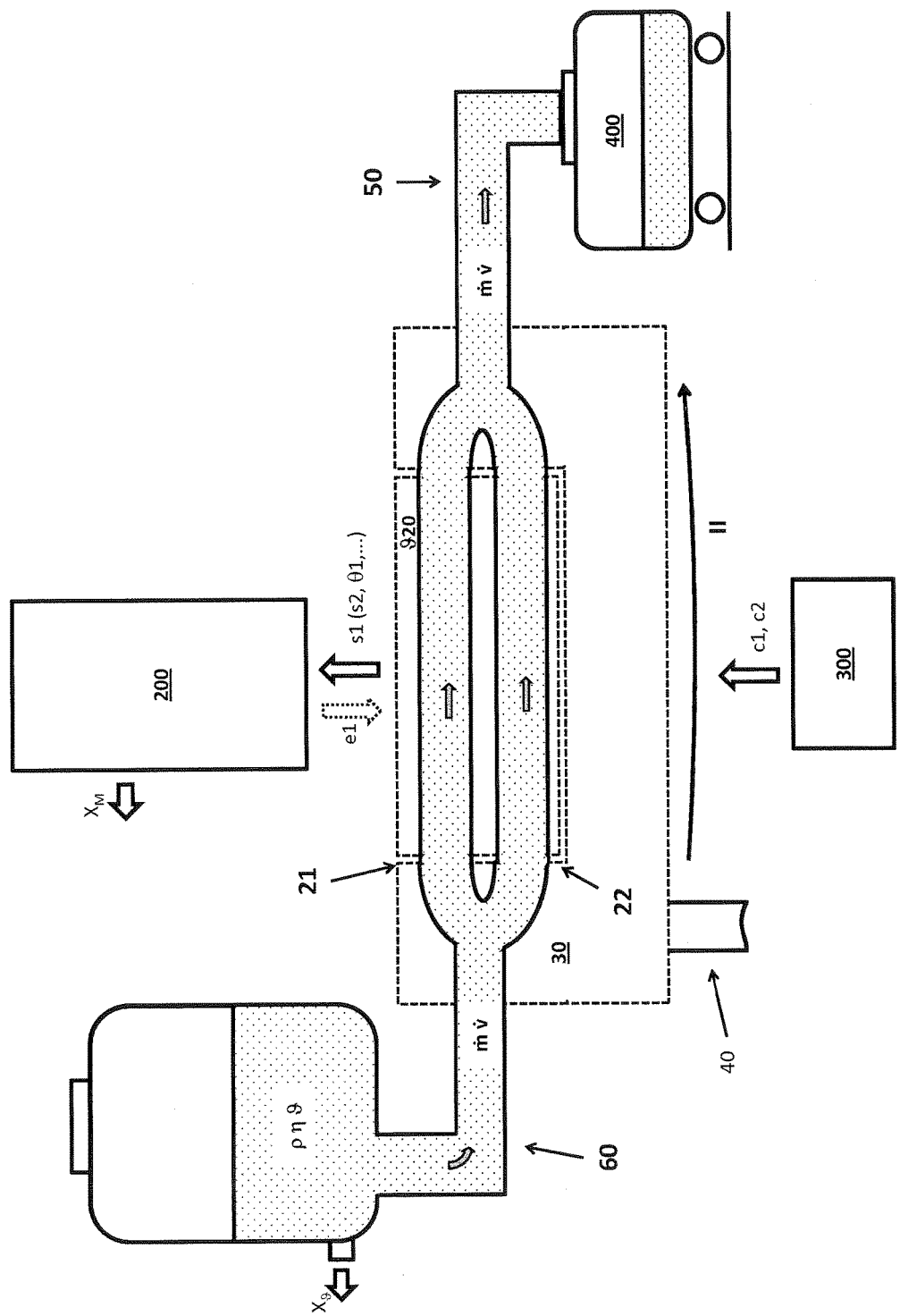
FIG. 5 is a second flow path different from the first flow path and opened by means of a measuring system of FIG. 1.

The measuring system can accordingly thus be operated in such a manner that—, as well as also shown schematically in FIG. 4—, first of all, the first flow path (I) is opened and thereafter fluid is caused to flow along the first flow path (I) in such a manner that a volume portion of the fluid flows, first of all, through the lumen of the first tube 21, further through the lumen of the second tube 22 and, only thereafter, further to the lumen of the fluid return line 40, and that—, as well as also shown schematically in FIG. 5, or as evident from a sequential combination of FIGS. 4 and 5—only later the second flow path (II) is opened and thereafter fluid is then caused to flow along the second flow path (II), in such a manner that a volume portion of the fluid flows through the lumen of the first tube, further to the lumen of the fluid withdrawal line 50 and at the same time another volume portion of the fluid flows through the lumen of the second tube further to the lumen of the fluid withdrawal line. The allowing of fluid to flow along the second flow path (II) can—, as well as also directly evident from a combination of FIGS. 1 and 5—, furthermore, comprise an allowing of the previously indicated volume portion of the fluid to flow from the first tube end 21*a* of the tube 21 in the direction of its second tube end 21*b* through the lumen of the tube 21 as well as a simultaneous allowing of the previously indicated other volume portion of the fluid to flow from the first tube end 22*a* of the tube 22 in the direction of its second tube end 22*b* through the lumen of the tube 22. As, furthermore, evident from a combination of FIGS. 1 and 4, the allowing of fluid to flow along the first flow path (I) can additionally comprise allowing a volume portion of the fluid to flow from the first tube end 21*a* of the tube 21 in the direction of its second tube end 21*b* through the lumen of the first tube 21 and an allowing of the volume portion of the fluid to continue to flow from the second tube end 22*b* of the tube 22 in the direction of its first tube end 22*a* through the lumen of the tube 22. The fluid allowed to flow along the first flow path (I) can, for example, serve for maintaining the temperature of the transducer apparatus and/or for cleaning at least parts of the measuring system, especially the transducer apparatus 20 and/or the fluid supply line 60, and/or for conditioning fluid to be temporarily retained in the supply container and later transferred via the second flow path. In a further embodiment of the invention, it is, additionally, provided that the first flow path and the second flow path are alternately provided, i.e. opened, so that the opening of the second flow path (II) includes an interrupting of the first flow path and/or the opening of the first flow path (I) includes an interrupting of the second flow path (II). For the previously indicated case, in which the measuring system includes the supply container 100, the opening of the first flow path (I)

comprises accordingly also a connecting of the lumen of the supply container 100 with the lumen of the fluid supply line 60, in such a manner that the first flow path (I) leads from the lumen of the supply container 100 further to the lumen of the fluid supply line 60. Equally, in such case, the opening of the second flow path (II) also comprises a connecting of the lumen of the supply container 100 with the lumen of the fluid supply line, in such a manner that the second flow path (II) leads from the lumen of the supply container 100 further to the lumen of the fluid supply line 60. For the other case, in which the measuring system includes the withdrawal container 400, the opening of the second flow path (II), according to another embodiment of the invention, comprises, furthermore, also a connecting of the withdrawal container 400 to the fluid withdrawal line 50, in such a manner that the second flow path (II) leads from the lumen of the fluid withdrawal line further to the lumen of the withdrawal container 400.

For conveying fluid along the first flow path (I), or along the second flow path (II), the measuring system can, furthermore, have at least one supply pump 70—, for example, a supply pump installed in the course of the fluid supply line 60 or in the measuring system between fluid supply line 60 and supply container 100—. The pump can be e.g. an electric motor operated, centrifugal pump.

According to the invention, it is, additionally, provided to generate at least at times by means of the transducer system 20 the at least one measurement signal s1, especially at least while allowing fluid to flow along the second flow path, as well as to use the measurement signal s1 for ascertaining at least one of the measured values $X_M$ representing the measured variable, or for ascertaining measured values $X_{M,i}$ for the at least one measured variable, for example, in such a manner that a sequence of the measured values $X_{M,i}$ represents the at least one measured variable of the fluid flowing along the second flow path (II) as a function of time, in given cases, also in real time. For such purpose, the measuring- and operating electronics 200 according to an additional embodiment of the invention is adapted to process at least one measurement signal s1, especially by means of the at least one measurement signal s1 to ascertain the measured value $X_M$, respectively the measured values $X_{M,i}$, for the at least one measured variable. In an additional embodiment of the invention, it is, additionally, provided to use the at least one measurement signal s1 and/or at least a portion of the measured values $X_{M,i}$ generated therewith for the at least one measured variable for ascertaining such measured values—useful, for instance, for an accounting or invoicing—, which represent an amount—, for example, a mass and/or a volume—of the total fluid allowed to flow through the second flow path (II), for instance, during a predetermined time interval, for instance, also in such a manner that a sequence of the measured values represents the amount of the fluid allowed to flow through the second flow path. Accordingly, measured values representing the amount of fluid flowing through the second flow path (II) can, for example, also serve for comparison with a correspondingly predetermined threshold value, for example, a threshold value representing an earlier established amount of the fluid to be delivered, in order, based thereon, to be able to determine whether further fluid should be allowed to flow along the second flow path (II), or whether a sufficient amount of fluid has already been allowed to flow along the second flow path (II). Accordingly, in a further embodiment of the invention, it is, additionally, provided to interrupt the second flow path, in case an exceeding of the threshold value is detected based on at least one of the measured values representing the amount of fluid allowed to flow through the second flow path.

In a further embodiment of the invention, it is, additionally, provided to generate the at least one measurement signal s1 both while allowing fluid to flow along the first flow path (I) as well as also while allowing fluid to flow along second flow path (II) as well as to use the measurement signal s1 for ascertaining measured values of the at least one measured variable; this, especially, also in such a manner that a sequence of the measured values generated based on the measurement signal represents the at least one measured variable also of the fluid flowing along the first flow path (I) as a function of time and/or with application of the same signal parameter as in the case of the ascertaining of the measured values of the fluid caused to flow along the second flow path.

In a further embodiment of the invention, the at least one measured variable is a mass flow rate m of the fluid allowed to flow through the measuring system, or a measured variable derived therefrom, for example, a total mass of the fluid allowed to flow through the transducer system and/or along the second flow path during a predetermined time interval. In a further embodiment, it is, additionally, provided to use the at least one measurement signal for ascertaining also measured values of the at least one other (second) measured variable differing from the at least one (first) measured variable, for instance, in such a manner that a sequence of the measured values represents the additional measured variable of the fluid flowing along the first flow path as a function of time and/or that a sequence of the measured values represents the additional measured variable of the fluid flowing along the second flow path as a function of time; especially, it is, in such case, provided that the at least one additional (second) measured variable is a density ρ of the fluid, for example, the density at least of the fluid allowed to flow along the first flow path. The measured value $X_M$, respectively the measured values $X_{M,i}$ can, furthermore, be displayed on-site, for example, by means of the display element and/or transmitted via a data connection—wired and/or radio waves based—to a superordinated electronic data processing system, for example, a process control system, respectively a programmable logic controller (PLC).

In a further embodiment of the invention, it is, additionally, provided to generate by means of the transducer system the at least one measurement signal s1, at least at times, also while allowing fluid to flow along the first flow path (I), for example, in order with application of the measurement signal to ascertain at least one of the measured values representing at least one measured variable of the fluid allowed to flow in the first flow path, or to ascertain a number of measured values $X_{M,i}$ for the measured variable, for example, also in such a manner that a sequence of the measured values represents the at least one measured variable of the fluid flowing along the first flow path (I) as a function of time. The measurement signal generated while allowing fluid to flow along the first flow path and the measured values $X_{M,i}$ based thereon can, furthermore, for example, also serve for calibrating the transducer system 20, or the measuring system formed therewith, for example, to ascertain (as found) a (scale) zero-point_of the measuring system, or a zero-point error, corresponding to the signal parameter of the at least one measurement signal and/or to conduct a zero adjustment of the measuring- and operating electronics 200, for example, to reset the zero-point of the measuring system (as left). Accordingly, according to a further embodiment of the invention, it is, additionally, provided to use the at least one measurement signal s1 also for calibrating the measuring- and operating electronics 200. The calibration can, in case, due to a detected, too large measurement error, a too large deviation between the at least one measured variable and a measured value ascertained therefor is required, additionally also include an adjustment of the measuring- and operating electronics 200, for example, a zero-point adjustment, in such a manner that thereafter the measuring error lies within a predetermined tolerance range. Alternatively or supplementally, measured values generated while allowing fluid to flow along the first flow path (I) can also serve to monitor an earlier specified quality of the fluid, for example, an extent of possible loading with impurity(ies), in order based thereon, to be able to determine, or decide, whether the fluid actually fulfills the aforementioned specification, so that flow can be along the second flow path (II) instead of along the first flow path (I) and fluid can be transferred into the above-mentioned withdrawal container 400.

The fluid allowed to flow through the second flow path (II), for example, the fluid to be transferred, can, such as already mentioned, be, for example, a methane and/or ethane and/or propane and/or butane containing fluid, respectively a liquefied gas, for example, a liquefied natural gas (LNG), respectively a methane, ethane, propane and/or butane containing, liquefied gas (LPG, NGL), a petroleum_or also a liquid fuel. Furthermore, the fluid allowed to flow through the second flow path (II) can also correspond to the fluid allowed to flow through the first flow path (I), and the fluid allowed to flow through the first flow path (I) and the fluid allowed to flow through the second flow path (II) can, in each case, be removed from one and the same reservoir—, for example, from the supply container 100. For the above-described case, in which both the fluid supply line 60 as well as also the fluid return line 40 are connected to the supply container 100, consequently the first flow path (I) forms a closed, circulatory system leading equally as well through the supply container and its lumen, the fluid, i.e. the fluid later to be transferred via the second flow path (II), kept, first of all, however, in the supply container 100, can be conditioned as regards its composition and quality—for example, degassed and/or cleaned—, by causing the fluid to flow, such as provided, among others, also in the above discussed WO-A 02/060805, first of all, along the (closed) first flow path (I) for a sufficiently long time, until it can be assured that the fluid thereafter to be led via the second flow path (II), i.e. the fluid to be transferred, is largely free of undesired impurities. For the above indicated case, in which the measuring system includes the supply container 100, consequently, the opening of the first flow path (I) according to a further embodiment of the invention includes, furthermore, also a connecting of the lumen of the fluid return line 40 with the lumen of the supply container 100, in such a manner that the first flow path (I) leads from the lumen of the fluid return line 40 further to the lumen of the supply container 100.

As discussed in, among others, also the above-mentioned WO-A 2014/151829, it can in the case of measuring systems of the type being discussed additionally also be advantageous, and, at times, also required, to bring the transducer system 20, especially at least its tubes, to an operating temperature 920 even before the opening of the second flow path (II) for transferring fluid and also to hold that temperature during the measuring, such temperature being as equal as possible to a fluid-temperature 9, i.e. a temperature of the fluid actually to be measured, here allowed to flow through the second flow path (II), and, firstly, held in the supply container 100, i.e. a temperature, which, during the actual measuring, thus at least while allowing fluid to flow along the second flow path, is largely constant; this not least of all also, in order, thus, to avoid an unfavorable influencing of the fluid by the transducer system 200, for example, an undesired warming, or cooling, of the fluid, and/or in order, thus, to minimize, or to prevent undesired measuring errors resulting from possible dependencies of the accuracy of measurement of the measuring system on a temperature difference $\Delta\vartheta$ a between the operating temperature 920 and the fluid temperature $\vartheta$, for example, an extreme fluid temperature, of less than $-40°$ C. or greater than $100°$ C., of the fluid instantaneously guided in the transducer apparatus 20 and/or from time changes ($\Delta\vartheta/\Delta t$) of the temperature difference $\Delta\vartheta$. Accordingly, according to a further embodiment of the invention, it is, additionally, provided, during operation of the measuring system, recurringly to ascertain, especially while allowing fluid to flow along the first flow path, the temperature difference existing between the operating temperature $\vartheta 20$ an of the transducer apparatus and the fluid temperature $\vartheta$. Furthermore, according to a further embodiment of the invention, the opening of the second flow path (II) occurs only after a temperature difference $\Delta\vartheta$ is detected, which lies within a predetermined tolerance range, for example, a tolerance range representing a steady thermal equilibrium state of the transducer apparatus and of the measuring system.

In order to be able to ascertain the temperature difference $\Delta\vartheta$ during operation of the measuring system, or in order, during operation of the measuring system, to be able to estimate, as exactly as possible, whether the transducer apparatus 20 has assumed a steady thermal equilibrium state corresponding to the actual fluid temperature $\vartheta$, according to a further embodiment of the invention, it is, consequently, furthermore, provided, during operation of the measuring system, also recurringly to ascertain the operating temperature $\vartheta 20$ of the transducer apparatus 20, for example, a temperature of the first tube 21 and/or of the second tube 22, for example, in order, based on such, to monitor possible changes of the operating temperature 420, or of the previously indicated temperature difference $\Delta\vartheta$, as a function of time. In a further embodiment of the invention, the transducer apparatus 20 is, consequently, furthermore, adapted, to deliver at least one auxiliary measurement signal $\theta 1$ corresponding to the operating temperature $\vartheta 20$, having at least one signal parameter dependent thereon, for example, a signal level dependent on the operating temperature $\vartheta 20$, or reacting to a change of the operating temperature $\vartheta 20$ with a change of the signal parameter. The auxiliary measurement signal can be, for example, an electrical signal having a voltage dependent on the operating temperature and/or an electrical current dependent on the operating temperature. For generating the auxiliary measurement signal, the measuring system, according to a further embodiment of the invention, additionally comprises at least one temperature sensor 25 thermally coupled with the tube 21 and adapted to register a temperature of the tube and to transduce such into the auxiliary measurement signal $\theta 1$ representing the temperature of the tube. Furthermore, the measuring- and operating electronics 200 is adapted to process at least one auxiliary measurement signal $\theta 1$, especially by means of the at least one auxiliary measurement signal $\theta 1$ to ascertain measured values $X_{M,i}$ for the at least one measured variable and/or measured values of the operating temperature $\vartheta 20$, i.e. the temperature of the tube 21. Furthermore, according to a further embodiment of the invention, it is, provided, to generate the at least one auxiliary measurement signal $\theta 1$ at least at times also while allowing fluid to flow along the first flow path (I), and to use the auxiliary measurement signal to ascertain measured values of the operating temperature of the transducer apparatus, for example, also in such a manner that a sequence of the measured values represents the operating temperature $\vartheta_{20}$ of the transducer apparatus as a function of time.

In a further embodiment of the invention, it is, additionally, provided to ascertain the fluid temperature $\vartheta$ recurringly, for example, in order to calculate the temperature difference $\Delta\vartheta$ as a difference between the currently ascertained operating temperature $\vartheta_{20}$ and the currently ascertained fluid temperature $\vartheta$. For ascertaining the fluid temperature $\vartheta$, the measuring system can, furthermore, have, for example, a temperature measuring device, which is adapted to register the fluid temperature of the fluid metrologically and recurringly to convert such into a temperature measured value $X_\vartheta$, i.e. a measured value representing the fluid temperature. The temperature measuring device can be arranged, for example, on the fluid supply line 60 or—as shown schematically in FIG. 1—, for example, at the supply container 100.

In case required, for instance, in order to be able to ascertain still more exactly a spatial temperature distribution within the fluid allowed to flow along the first, or second, flow path, or within the measuring system, the measuring system can have yet more temperature measuring devices arranged, for example, on the fluid supply line 60 and/or fluid return line 40 and/or on the fluid withdrawal line 50. Alternatively or supplementally, the measuring system can further comprise one or more pressure measuring devices, for example, in order to monitor pressure within the fluid allowed to flow along the first flow path and/or within the fluid allowed to flow along the second flow path, or in order to be able to ascertain a thermal state of the fluid corresponding therewith and/or to monitor, based on the pressure measurements, the ability of the measuring system to function.

For conditioning the transducer apparatus or the measuring system formed therewith in the above-described manner, according to a further embodiment of the invention, it is provided so to set, or so to choose, the fluid temperature of the fluid allowed to flow through the first, or through the second, flow path such that fluid allowed to flow through the second flow path (II) has, at least at times, a temperature, which equals, or at least approximately equals, a temperature of the fluid allowed to flow through the first flow path (I), for example, thus in such a manner that the fluid both during flow through the first flow path (I) as well as also during flow through the second flow path (II) has, in each case, a temperature of less than −40° C., or that the fluid has both during flow through the first flow path (I) as well as also during flow through the second flow path (II), in each case, a temperature of greater than 100° C. Alternatively or supplementally, the fluid allowed to flow through the first flow path can also serve recurringly to clean, especially also to disinfect, or to sterilize (CIP, SIP), (inner-) surfaces of the components of the measuring system, which form the first flow path and which are contacted by the fluid.

In order to be able to assure in as simple equally as well effective manner that the fluid and/or the transducer apparatus 20, respectively the measuring system formed therewith, are conditioned in the previously indicated manner, for instance, in such a manner that at least the fluid conveyed along the second flow path (II) fulfills a required specification and/or that the transducer apparatus 20, at least while allowing fluid to flow along the second flow path (II), is operated with an operating temperature suitable and/or specified for ascertaining the at least one measured variable, according to a further embodiment of the invention, it is, additionally, provided to only open the second flow path (II) after a predetermined amount of fluid (for example, fluid correspondingly temperature maintained, namely fluid at least approximately having a temperature corresponding to the temperature of the fluid to be allowed to flow thereafter along the second flow path) has flowed along the first flow path (I) leading, in given cases, via the fluid return line 40 also back into the supply container 100, or after the fluid has flowed for a predetermined duration along the first flow path. Moreover, it is, however, also possible to ascertain an optimal point in time for opening the second flow path, or for switching the measuring system from the first flow path to the second flow path, by a comparison, for example, a comparison performed by means of the measuring- and operating electronics 200, of selected measured values, for example, of the instantaneous operating temperature, with predetermined or predeterminable reference values ascertained during operation, for example, reference values corresponding to the instantaneous fluid temperature, or derived therefrom, or, as a function of such a comparison, correspondingly to generate control commands initiating the opening of the second flow path (II), or an interrupting of the first flow path (I). In a further embodiment of the invention, it is, additionally, provided, during operation of the measuring system, to compare at least one of the measured values of the operating temperature $\vartheta_{20}$ of the transducer apparatus 20 generated, for example, by means of the measuring- and operating electronics 200, with the at least one measured value of the fluid temperature $\vartheta$—, for example, a fluid temperature value ascertained while allowing fluid to flow along the first flow path (I). Furthermore, it is provided to open second flow path (II) only when, by the comparison of the at least one of the measured values of the operating temperature of the transducer apparatus with the at least one measured value of the fluid temperature, it is ascertained, i.e. detected, that the temperature difference $\Delta\vartheta$ existing between the operating temperature an of the transducer apparatus and the fluid temperature $\vartheta$ lies within a predetermined tolerance range, for example, a tolerance range representing a steady, thermal equilibrium state of the transducer apparatus 20. Alternatively or supplementally, however, for example, also interesting material characteristics of the fluid allowed to flow in the first flow path, such as e.g. its density and/or its viscosity, can be ascertained, and thereafter correspondingly evaluated, by means of the measuring- and operating electronics 200, for example, with application of the measurement signal s1 and/or further measuring-, or auxiliary measurement signals (s2, θ1 . . . ), in order based thereon to ascertain the above discussed, optimal point in time for opening the second flow path.

For opening or interrupting the above discussed flow paths (I; II) involving both the lumen of the first tube 21 as well as also the lumen of the second tube 22, the measuring system, according to a further embodiment of the invention, further comprises a control apparatus 30, which is embodied to open the first flow path (I), and which is additionally embodied to open the second flow path (II). The control apparatus 30 is connected, in the example of an embodiment shown here, both to the fluid supply line 60 as well as also to the fluid return line 40 as well as also to the fluid withdrawal line 50. In a further embodiment of the invention, the control apparatus 30 includes a line branch 33 with a lumen having a first flow opening 33a as well as also a second flow opening 33b as well as a third flow opening 33c. Line branch 33 can be formed, for example, by means of a T-piece, i.e. be so embodied that its lumen is essentially T- or Y-shaped. In the case of the example of an embodiment shown in FIG. 6, the line branch 33 is at the second line end 60b of the fluid supply line 60, for example, connected by means of a flange connection, and, indeed, in such a manner that the lumen of the line branch 33 communicates via the first flow opening 33a with the lumen of the fluid supply line 60. Furthermore, the line branch 33 is here also connected to the first tube end 21a of the first tube 21, for example, by means of a flange connection, in such a manner that the lumen of the line branch 33 communicates via the second flow opening 33b with the lumen of the first tube 21. Using the line branch 33 integrated in the above explained manner into the measuring system, the opening of the first flow path (I) can occur by, among other things, closing, i.e. blocking, the flow opening 33c of the line branch 33, especially pressure-tightly and hermetically. Furthermore, the opening of the second flow path (II) can, in such case, occur by, among other things, correspondingly opening the flow opening 33c of the line branch 33. For connecting the line branching 33 to tubes emanating therefrom, the line branch 33 can—, as well as also shown schematically in FIG. 6—, furthermore, have corresponding connecting flanges, for example, a connecting flange surrounding its first flow opening 33a and/or a connecting flange surrounding its second flow opening 33b and/or a connecting flange surrounding its third flow opening 33c.

In a further embodiment of the invention, the control apparatus 30 further comprises a line junction 34 with a lumen, for example, a lumen defined by a metal wall and/or a circularly cylindrical lumen, which terminates in a first flow opening 34a of the line junction 34 as well as also in a second flow opening 34b of the line junction 34 as well as in a third flow opening 34c of the line junction 34—for example, a third flow opening framed by a connecting flange 34.1. Line junction 34 is especially connected both to the second tube end 21b of the first tube as well as also to the second tube end 22b of the second tube, for example, by means of welded connections or by means of soldered or brazed connections, and, indeed, in such a manner that the lumen of the line junction 34 communicates via the first flow opening 34a with the lumen of the first tube 21 and via the second flow opening 34b with the lumen of the second tube 22. For the case, in which the transducer apparatus 20 is a measuring transducer, for example, a vibronic or a magneto-inductive measuring transducer, for generating at least one measurement signal corresponding to the at least one measured variable, for example, also the line junction 34 can—, as well as also indicated in FIGS. 2a and 2b or FIGS. 3a and 3b and as directly evident from a combination of FIGS. 2a, 2b, 6, 3a and 3b—be a component of the measuring transducer. Using the line junction 34 integrated in the measuring system in the above indicated manner, the opening of the first flow path (I) can occur by, among other things, closing or blocking the third flow opening 34c of the line junction 34, especially pressure-tightly and hermetically, and the opening of the second flow path can occur by, among other things, opening the flow opening 34c.

In a further embodiment of the invention, the control apparatus 30 further comprises a first (fluidic) switch element 31 having at least two different switch positions, for example, an electric motor- or electromagnetically actuated valve, a 3-paths valve or a 3-paths mixer, with a first connection 31.1, a second connection 31.2 and a third connection 31.3. Switch element 31 is, especially, adapted, in a first switch position, to provide and to open a first flow duct 31-I leading from the first connection 31.1, especially only, to the second connection 31.2. Moreover, the switch element 31 is adapted, in a second switch position different from the first switch position, to provide and to open a second flow duct 31-II leading from the third connection 31.3, especially only, to the first connection 31.1; this, especially, also in such a manner that in the case of provided and opened, second flow duct 31-II at the same time also the first flow duct 31-I is blocked. First switch element 31 can accordingly also be formed by means of a two-way valve, for example, —as well as also in FIG. 6 shown—by means of a so-called 3/2-displacement valve.

Figure 6:
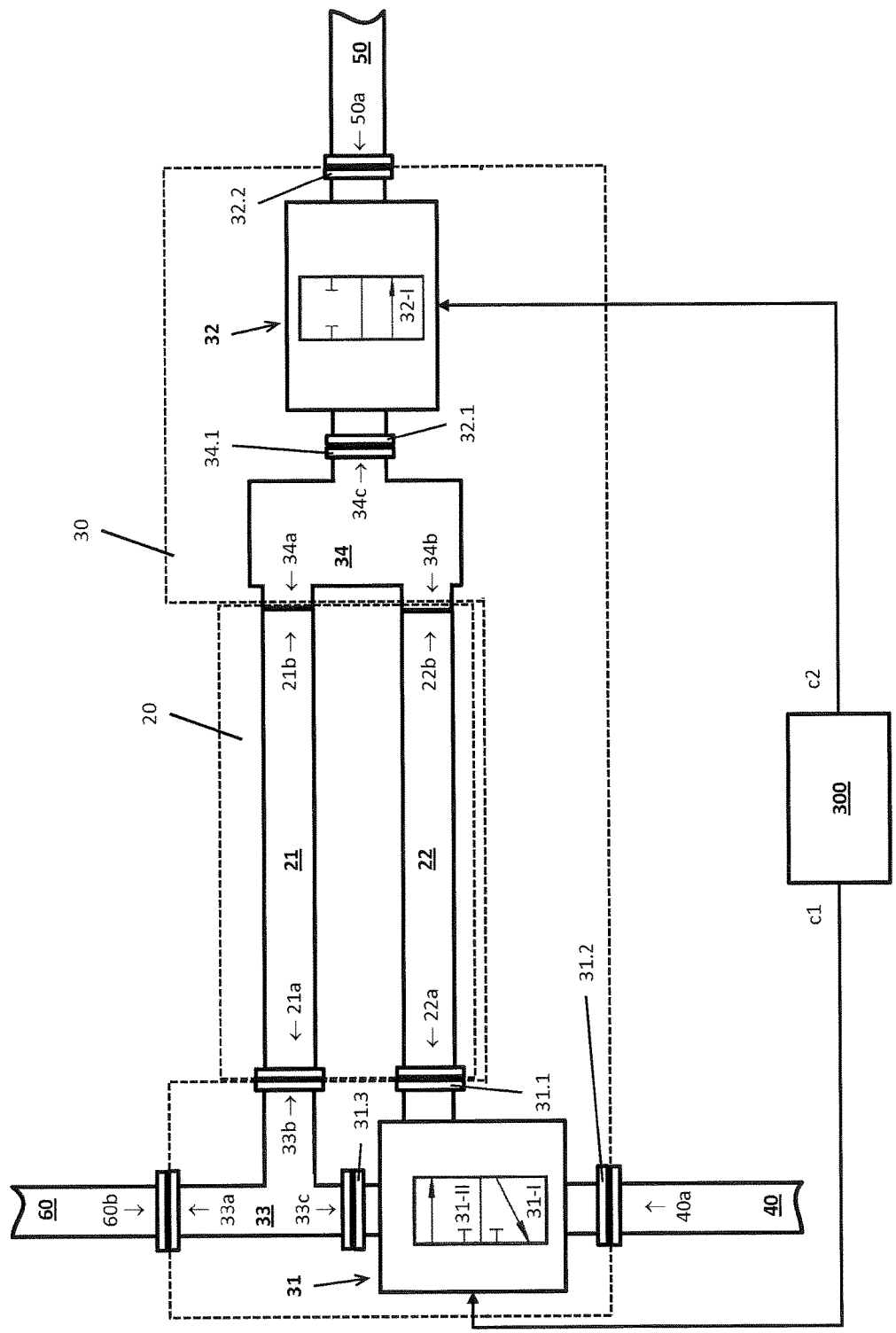
FIG. 6 is an example of an embodiment of a control system useful for opening a first flow path of FIG. 4 as well as a second flow path of FIG. 5.

Especially, the first switch element 31 is, furthermore, so embodied and so incorporated within the measuring system that—, as well as also shown in FIG. 6 and evident from a combination of FIGS. 4, 5 and 6—the first flow duct 31-I of the switch element 31 forms a subsection of the first flow path (I) and the second flow duct 31-II of the switch element 31 forms a subsection of the second flow path (II). For such purpose, the first switch element 31 is, according to a further embodiment of the invention, connected to the first tube end 22a of the second tube 22, for example, with the first connection 31.1 and/or by means of a flange connection; this, especially, in such a manner that the first flow duct 31-I of the switch element 31, to the extent that it is provided and opened, communicates with the lumen of the second tube 22, and that the second flow duct 31-II of the first switch element 31, to the extent that it is provided and opened, communicates with the lumen of the second tube 22.

In a further embodiment of the invention, the first switch element 31 is—, as well as also shown schematically in FIG. 6—, furthermore, also connected to the first tube end 40a of the fluid return line 40, for example, with the second connection 31.2, respectively by means of a flange connection; this, especially, in such a manner that the first flow duct 31-I of the first switch element 31, to the extent that it is provided and opened, communicates with the lumen of the fluid return line 40, respectively in such a manner that the first flow duct 31-I of the first switch element 31, to the extent that it is provided and opened, communicates both with the lumen of the fluid return line 40 as well as also with the lumen of the second tube 22. Using the above mentioned line branch 33, the above-mentioned incorporating of the first switch element 31 into the measuring system can be further implemented and completed e.g.—, as well as also shown in FIG. 6 and evident from a combination of FIGS. 4, 5 and 6—by connecting the first switch element 31, e.g. using the third connection 31.3, to the line branch 33, for example, its third flow opening 33c, in such a manner that the second flow duct 31-II of the first switch element 31, to the extent that it is provided and opened, communicates with the lumen of the line branch 33, or in such a manner that the second flow duct 31-II of the first switch element 31, to the extent that it is provided and opened, communicates both with the lumen of the line branch 33 as well as also with the lumen of the second tube 22.

In a further embodiment of the invention, the control apparatus 30 further comprises, especially also for the purpose of implementing the first and second flow paths, a second (fluidic) switch element 32 with a first connection 32.1 and a second connection 32.2 and having at least two different switch positions. The second switch element 32, formed, for example, by means of an electric motor- or electromagnetically actuated valve, is, especially, adapted, in a first switch position, to provide and to open a flow duct 32-I leading from the first connection 32.1 to the second connection 32.2. Especially, the second switch element 32 is, furthermore, so embodied and so incorporated within the measuring system that—, as well as also shown in FIG. 6, and evident from a combination of FIGS. 4, 5 and 6—the flow duct 32-I of the switch element 32 forms a subsection of the second flow path (II). Moreover, the switch element 32 is also adapted, in a second switch position different from the first switch position, to block the flow duct 32-I; this, especially, in such a manner that no flow duct is provided. Switch element 32 can accordingly be formed, for example, also by means of a shut-off valve. For the previously indicated case, in which a line junction 34 is provided in the control apparatus, the second switch element 32, according to a further embodiment of the invention, is connected to the line junction 34, for example, with the first connection 32.1 and/or by means of a flange connection; this, especially, in such a manner that the flow duct 32-I of the switch element 32, to the extent that it is provided and opened, communicates via the first flow opening 34a of the line junction 34 with its lumen. For connecting switch element 32 to the line junction 34, the connection 32.1 of the switch element 32 can, as well as also indicated in FIG. 6, be embodied, for example, as a connecting flange corresponding to a connecting flange 34.1 surrounding the third flow opening 34c of the line junction 34. In a further embodiment of the invention, the second switch element 32 is, for example, with the second connection 32.2, connected to the first tube end 50a of the fluid-withdrawal line 50, e.g. by means of a flange connection; this, especially, in such a manner that the flow duct 32-I of the second switch element 32, to the extent that it is provided and opened, communicates with the lumen of the fluid withdrawal line 50, or in such a manner that the flow duct 32-I of the second switch element 32, to the extent that it is provided and opened, communicates both with the lumen of the above discussed line junction 34 as well as also with the lumen of the fluid withdrawal line 50.

For activating the control apparatus, especially for generating and outputting control signals c1, c2 bearing control commands effecting the setting of the first flow path (I), or the second flow path (II), the measuring system comprises, according to a further embodiment of the invention, a control electronics 300 electrically coupled with the control system, for example, connected via signal line to the control system. The control electronics 300 can—such as quite usual for electronics of this type—be accommodated in advantageous manner in its own electronics housing 300', e.g. of a metal and/or a synthetic material, especially also a housing sealed against water spray and/or dust and/or formed explosion resistantly and/or by means of an electrical cabinet; alternatively or in supplementation, the control electronics 300, or selected components thereof, can be accommodated together with the measuring- and operating electronics 200 also in the electronics protective housing 200'. For transferring measured values $X_{M,i}$ ascertained by the measuring- and operating electronics 200 to the control electronics 300 and/or for transferring control commands generated by the control electronics 300 to the measuring- and operating electronics 200, the measuring system, according to a further embodiment of the invention, further comprises a data connection 500, e.g. a data connection established by means of a data cable and/or based on radio waves, or the measuring- and operating electronics 200 as well as the control electronics 300 are adapted to communicate with one another, for example, for transmitting measured values ascertained by the measuring- and operating electronics 200 to the control electronics 300, or for transmitting control commands generated by the control electronics 300 to the measuring- and operating electronics 200, for example, via fieldbus, for instance, according to IEC 61158, IEC 61784-1, respectively IEC 61784-2, and/or via radio connection, for instance, according to_IEEE 802.11 or IEEE 802.15.4.

The invention claimed is:
1. A measuring system for measuring at least one measured variable of a flowing fluid, said measuring system comprising:
  a fluid supply line, said fluid supply line including an open first line end, an open second line end and a lumen extending from the first line end to the second line end;
  a transducer apparatus, said transducer apparatus having a first tube with an open first tube end, an open second tube end and a lumen extending from said first tube end to said second tube end, and said transducer apparatus having at least a second tube with an open first tube end, an open second tube end and a lumen extending from said first tube end to said second tube end, said transducer apparatus being adapted to deliver at least one measurement signal corresponding to the at least one measured variable, said at least one measurement signal exhibiting at least one signal parameter dependent on the measured variable and/or said at least one measurement signal reacting to a change of the measured variable with a change of at least one signal parameter;
  a fluid return line with an open first line end, an open second line end and a lumen extending from said first line end to said second line end;
  a fluid withdrawal line with an open first line end, an open second line end and a lumen extending from said first line end to said second line end; and
  a control apparatus for opening or interrupting flow paths involving both said lumen of said first tube as well as also said lumen of said second tube, wherein:
  said control apparatus is embodied to provide a first flow path leading from said lumen of said fluid supply line to said lumen of said first tube of said transducer apparatus, further to said lumen of said second tube of said transducer apparatus and further to said lumen of said fluid return line, equally as well not to said lumen of said fluid withdrawal line; and
  said control apparatus is embodied to provide a second flow path leading from said lumen of said fluid supply line to said lumen of said first tube of said transducer apparatus and, in parallel, to said lumen of said second tube of said transducer apparatus and further from said lumen of said first tube and from said lumen of said second tube, in each case, to said lumen of said fluid withdrawal line.

2. The measuring system as claimed in claim 1, wherein:
  said control apparatus comprises: a line branch, formed by means of a T- or Y-shaped lumen, having a first flow opening as well as also a second flow opening as well as a third flow opening.

3. The measuring system as claimed in claim 2, wherein:
  said first switch element is connected, with said third connection, to said line branch, its third flow opening and/or by means of a flange connection, in such a manner that said second flow duct, to the extent that it is provided and opened, communicates with the lumen of said line branch.

4. The measuring system as claimed in claim 2, wherein:
  said line branch is connected to said second line end of said fluid supply line, by means of a flange connection, in such a manner that the lumen of said line branch communicates via said first flow opening with the lumen of said fluid supply line; and/or said line branch is connected to said first tube end of said first tube, by means of a flange connection, in such a manner that the lumen of said line branch communicates via said second flow opening with the lumen of said first tube; and/or said line branch has a connecting flange surrounding its first flow opening; and/or said line branch has a connecting flange surrounding said second flow opening; and/or said line branch has a connecting flange surrounding said third flow opening.

5. The measuring system as claimed in claim 1, wherein: said control apparatus comprises: a first switch element having at least two different switch positions, a first switch element formed by means of at least one two-way valve, with a first connection, a second connection and a third connection, and adapted, in a first switch position, to provide and to open a first flow duct leading from said first connection, only to said second connection, and adapted, in a second switch position, to provide and to open a second flow duct leading from said third connection, only to said first connection, also to block said first flow duct, in such a manner that said first flow duct forms a subsection of said first flow path, respectively that said second flow duct forms a subsection of said second flow path.

6. The measuring system as claimed in claim 5, wherein: said first switch element is connected, with said first connection, to said first tube end of said second tube, by means of a flange connection, in such a manner that said first flow duct, to the extent that it is provided and opened, communicates with the lumen of said second tube, and that said second flow duct, to the extent that it is provided and opened, communicates with the lumen of said second tube; and/or said first switch element is connected, with said second connection, to said first tube end said fluid return line, by means of a flange connection, in such a manner that said first flow duct, to the extent that it is provided and opened, communicates with the lumen of said fluid return line.

7. The measuring system as claimed in claim 1, wherein: said control apparatus comprises: a second switch element having at least two different switch positions, a second switch element formed by means of at least one shut-off valve, with a first connection and a second connection, and adapted, in a first switch position, to provide and to open a flow duct leading from said first connection to said second connection in such a manner that the flow duct of said second switch element forms a subsection of the second flow path, and adapted, in a second switch position to block said flow duct, to provide and to open no flow duct.

8. The measuring system as claimed in claim 7, wherein: said second switch element is connected, with said second connection, to said first tube end of the fluid-withdrawal line, by means of a flange connection, in such a manner that said flow duct, to the extent that it is provided and opened, communicates with the lumen of said fluid withdrawal line.

9. The measuring system as claimed in claim 1, wherein: said control apparatus comprises: a line junction with a circular cylindrical lumen having a first flow opening of said line junction as well as also a second flow opening of said line junction as well as a third flow opening of said line junction.

10. The measuring system as claimed in claim 9, wherein: said second switch element is connected, with said first connection, to said line junction, by means of a flange connection, in such a manner that said flow duct, to the extent that it is provided and opened, communicates via said first flow opening with the lumen of said line junction.

11. The measuring system as claimed in claim 9, wherein: said line junction is connected both to said second tube end of said first tube as well as also to said second tube end of said second tube, by means of a welded connection or by means of a soldered or brazed connection, in such a manner that the lumen of said line junction communicates via said first flow opening with the lumen of said first tube and via said second flow opening with the lumen of said second tube; and/or said line junction has a connecting flange surrounding said third flow opening.

12. The measuring system as claimed in claim 1, wherein: said transducer apparatus is a component of a vibronic measuring transducer, serving for generating at least one measurement signal corresponding to the at least one measured variable.

13. The measuring system as claimed in claim 12, wherein:
said line junction is a component of said vibronic measuring transducer.

14. The measuring system as claimed in claim 1, further comprising:
a supply container, one formed by means of a tank, with a lumen at least partially filled with the fluid, especially fluid having a temperature of less than −40° C.

15. The measuring system as claimed in claim 14, wherein:
said fluid supply line is connected to said supply container; and/or
said fluid return line is connected to said supply container.

16. The measuring system as claimed in claim 1, further comprising:
a transport pump, which is adapted to drive fluid along said first flow path and/or along said second flow path.

17. The measuring system as claimed in claim 1, further comprising:
at least one measuring—and operating electronics, electrically coupled with said transducer apparatus and adapted to process at least one measurement signal, to ascertain by means of said at least one measurement signal the measured values of the at least one measured variable, a mass flow rate, or measured values representing a total mass flow of the fluid allowed to flow along said second flow path or a volume flow rate, or measured values representing a total volume flow of the fluid allowed to flow along said second flow path.

18. The measuring system as claimed in claim 17, further comprising:
a data connection, said data connection established by means of data cable and/or based on radio waves, for transferring to said control electronics measured values ascertained by said measuring- and operating electronics and/or for transferring to said measuring- and operating electronics control commands generated by said control electronics.

19. The measuring system as claimed in claim 18, wherein:
said measuring- and operating electronics as well as said control electronics are adapted to communicate with one another, especially via a fieldbus and/or via a radio connection, to transmit to said control electronics measured values ascertained by said measuring- and operating electronics, or to transmit to said measuring- and operating electronics control commands generated by said control electronics.

20. The measuring system as claimed in claim 17, wherein:
   said measuring- and operating electronics is adapted to process said at least one auxiliary measurement signal, to ascertain by means of said at least one auxiliary measurement signal the measured values of the at least one measured variable and/or measured values of the temperature of said first tube.

21. The measuring system as claimed in claim 1, further comprising:
   a control electronics electrically coupled with said control apparatus and adapted to generate and to output control signals operating said control apparatus, said control signals carrying control commands effecting the opening of said first flow path or said second flow path.

22. The measuring system as claimed in claim 1, further comprising:
   at least one temperature sensor thermally coupled with said first tube and adapted to register a temperature of the tube and to transduce such into an auxiliary measurement signal, representing the temperature and having at least one signal parameter dependent on the temperature, or reacting to a change of the temperature of said first tube with a change of the signal parameter.

23. The measuring system as claimed in claim 1, further comprising:
   a withdrawal container arranged downstream of said fluid withdrawal line, said withdrawal container being a mobile withdrawal container and/or a withdrawal container temporarily connected to said fluid withdrawal line.

24. The measuring system as claimed in claim 1, wherein:
   said transducer apparatus forms a measuring transducer, a vibronic or a magneto-inductive, measuring transducer, serving for generating at least one measurement signal corresponding to said at least one measured variable.

25. The measuring system as claimed in claim 1, wherein:
   at least the fluid allowed to flow through said second flow path contains methane and/or ethane and/or propane and/or butane; and/or
   at least the fluid allowed to flow through said second flow path is a liquefied gas, a methane, ethane, propane and/or butane containing, liquefied gas and/or a liquefied natural gas (LNG); and/or;
   the fluid allowed to flow through said second flow path corresponds to the fluid allowed to flow through said first flow path; and/or
   the fluid allowed to flow through said second flow path has a temperature, which equals a temperature of the fluid allowed to flow through said first flow path; and/or
   the fluid has, at least at times, both during flow through the first flow path as well as also during flow through said second flow path, a temperature of less than −40° C.; and/or
   the fluid has, at least at times, both during flow through the first flow path as well as also during flow through said second flow path, a temperature of greater than 100° C.; and/or
   fluid allowed to flow through said second flow path has, at least at times, a temperature, which equals a temperature of the fluid allowed to flow through said first flow path.

26. The use of a measuring system as claimed in claim 1 for ascertaining measured values of the at least one measured variable—a mass flow rate, a total mass flow, a volume flow rate, a total volume flow, a density, a viscosity or a temperature—of a fluid to be transferred, a liquefied gas, for example, a methane and/or ethane and/or propane and/or butane containing, liquefied gas and/or a liquefied natural gas (LNG).

27. A method for operating a measuring system serving for measuring at least one measured variable of a flowing fluid, said measuring system comprising:
   a fluid supply line, said fluid supply line including an open first line end, an open second line end and a lumen extending from the first line end to the second line end,
   a transducer apparatus, said transducer apparatus including a first tube with an open first tube end, an open second tube end and a lumen extending from the first tube end to the second tube end and said transducer apparatus including at least a second tube with an open first tube end, an open second tube end and a lumen extending from the first tube end to the second tube end, said transducer apparatus being adapted to deliver at least one measurement signal corresponding to the at least one measured variable, said at least one measurement signal exhibiting at least one signal parameter dependent on the measured variable and/or said at least one measurement signal reacting to a change of the measured variable with a change of at least one signal parameter;
   a fluid return line with an open first line end, an open second line end and a lumen extending from the first line end to the second line end; and
   a fluid withdrawal line with an open first line end, an open second line end and a lumen extending from the first line end to the second line end, said method comprising:
   opening a first flow path, which leads from the lumen of the fluid supply line to the lumen of the first tube, further to the lumen of the second tube and further to the lumen of the fluid return line, equally as well not to the lumen of the fluid withdrawal line;
   allowing fluid to flow along the first flow path in such a manner that a volume portion of the fluid flows, first of all, through the lumen of the first tube, further through the lumen of the second tube and, only thereafter, further to the lumen of the fluid return line;
   opening a second flow path, which leads from the lumen of the fluid supply line to the lumen of the first tube and, in parallel, to the lumen of the second tube and further from the lumen of the first tube and from the lumen of the second tube, in each case, to the lumen of the fluid withdrawal line;
   allowing fluid to flow along the second flow path in such a manner that a volume portion of the fluid flows through the lumen of the first tube further to the lumen of the fluid withdrawal line and at the same time another volume portion of the fluid flows through the lumen of the second tube further to the lumen of the fluid withdrawal line;
   generating the at least one measurement signal during the allowing of the fluid to flow along the second flow path; and
   using the at least one measurement signal for ascertaining measured values of the at least one measured variable.

28. The method as claimed in claim 27, wherein:
   the allowing of fluid to flow along the first flow path comprises allowing a volume portion of the fluid to flow from the first tube end of the first tube in the direction of its second tube end through the lumen of the first tube and allowing the volume portion of the fluid to continue to flow from the second tube end of the second tube in the direction of its first tube end through the lumen of the second tube; and/or the allowing of fluid to flow along the first flow path serves for maintaining the temperature of the transducer apparatus; and/or the allowing of fluid to flow along the first flow path serves for the at least partial cleaning of the measuring system, especially for cleaning the transducer apparatus and/or the fluid supply line; and/or the allowing of fluid to flow along the first flow path serves for conditioning the fluid; and/or the allowing of fluid to flow along the second flow path comprises allowing a volume portion of the fluid to flow from the first tube end of the first tube in the direction of its second tube end through the lumen of the first tube as well as simultaneously allowing another volume portion of the fluid to flow from the first tube end of the second tube in the direction of its second tube end through the lumen of the second tube; and/or the opening of the second flow path includes an interrupting of the first flow path; and/or the opening of the first flow path includes an interrupting of the second flow path; and/or the second flow path does not lead to the lumen of the fluid return line.

29. The method as claimed in claim 27, further comprising:

generating the at least one measurement signal while allowing fluid to flow along the first flow path; and using the at least one measurement signal for ascertaining the signal parameter of the at least one measurement signal and/or for ascertaining a (scale-) zero-point of the measuring system corresponding to the signal parameter of the at least one measurement signal.

30. The method as claimed in claim 27, wherein:

the measuring system further comprises a line branch, a line branch formed by means of a T-piece, with a lumen having a first flow opening as well as also a second flow opening as well as a third flow opening, especially T- or Y shaped lumen.

31. The method as claimed in claim 30, wherein:

the opening of the first flow path includes a closing, a pressure tight, respectively hermetic closing, or blocking of the third flow opening of the line branch; and/or the opening of the second flow path includes an opening of the third flow opening of the line branch.

32. The method as claimed in claim 31, wherein:

the line branch is connected to the second line end of the fluid supply line, by means of a flange connection, in such a manner that the lumen of the line branch communicates via the first flow opening with the lumen of the fluid supply line; and/or the line branch is connected to the first tube end of the first tube, by means of a flange connection, in such a manner that the lumen of the line branch communicates via the second flow opening with the lumen of the first tube.

33. The method as claimed in claim 27, wherein:

the measuring system further comprises a line junction with a circularly cylindrical lumen having a first flow opening as well as also a second flow opening as well as a third flow opening.

34. The method as claimed in claim 33, wherein:

the line junction is connected both to the second tube end of the first tube as well as also to the second tube end of the second tube, by means of welded connection or by means of soldered connection, in such a manner that the lumen of the line junction communicates via the first flow opening with the lumen of the first tube and via the second flow opening with the lumen of the second tube; and/or the opening of the first flow path includes a closing, especially a pressure tight or hermetic closing, or a blocking of the third flow opening of the line junction; and/or the opening of the second flow path includes an opening of the third flow opening of the line junction.

35. The method as claimed in claim 27, wherein:

the measuring system further comprises: a supply container, a supply container formed by means of a tank and/or a mobile supply container, having a lumen at least partially filled with the fluid.

36. The method as claimed in claim 35, wherein:

the opening of the first flow path includes a connecting of the lumen of the supply container with the lumen of the fluid supply line, in such a manner that the first flow path leads from the lumen of the supply container further to the lumen of the fluid supply line; and/or the opening of the first flow path includes a connecting of the lumen of the fluid return line with the lumen of the supply container, in such a manner that the first flow path leads from the lumen of the fluid return line further to the lumen of the supply container; and/or the opening of the second flow path includes a connecting of the lumen of the supply container with the lumen of the fluid supply line, in such a manner that the second flow path leads from the lumen of the supply container further to the lumen of the fluid supply line.

37. The method as claimed in claim 27, wherein:

the measuring system further comprises: a measuring- and operating electronics electrically coupled with the transducer apparatus.

38. The method as claimed in claim 37, wherein:

the measuring- and operating electronics is adapted to process at least one measurement signal, especially to ascertain by means of the at least one measurement signal the measured values of the at least one measured variable.

39. The method as claimed in claim 37, further comprising:

using the at least one measurement signal for calibrating the measuring—and operating electronics, also for adjusting the measuring—and operating electronics, in such a manner, that a measuring error, a deviation between the at least one measured variable and an ascertained measured value, lies within a predetermined tolerance range.

40. The method as claimed in claim 27, further comprising:

ascertaining an operating temperature of the transducer apparatus, especially a temperature of the first tube and/or second tube; and/or ascertaining a temperature of the fluid, especially fluid held in a supply container; and/or ascertaining, especially while allowing fluid to flow along the first flow path, a temperature difference existing between an operating temperature of the transducer apparatus, especially a temperature of the first tube and/or second tube, and a fluid temperature, i.e. a temperature of the fluid, especially fluid held in a supply container.

41. The method as claimed in claim 27, wherein:
the opening of the second flow path occurs after a temperature difference is ascertained between an operating temperature of the transducer apparatus, a temperature of the first tube and/or second tube, and the fluid temperature, a temperature of the fluid, fluid held in a supply container, which temperature difference lies within a predetermined tolerance range, a tolerance range representing a steady thermal equilibrium state of the transducer apparatus, respectively of the measuring system; and/or
the opening of the second flow path occurs after a predetermined amount of fluid has flowed along the first flow path and/or after fluid has flowed for a predetermined duration along the first flow path; and/or
a step of generating the at least one measurement signal comprises steps of effecting mechanical oscillations of the first tube and/or second tube, mechanical oscillations both of the first tube and also of the second tube, as well as steps of registering oscillatory movements, opposite equal, oscillatory movements, of the first and/or second tube.

42. The method as claimed in claim 27, wherein:
the transducer apparatus is adapted to deliver at least one auxiliary measurement signal, an electrical, auxiliary measurement signal, corresponding to an operating temperature of the transducer apparatus, a temperature of the first tube and/or a temperature of the second tube, and having at least one signal parameter dependent on the operating temperature, a signal level dependent on the operating temperature, or reacting to a change of the operating temperature with a change of the signal parameter.

43. The method as claimed in claim 42, further comprising:
using the at least one auxiliary measurement signal, one delivered while allowing fluid to flow along the first flow path, for ascertaining measured values of the operating temperature of the transducer apparatus, in such a manner that a sequence of the measured values represents the operating temperature of the transducer apparatus as a function of time.

44. The method as claimed in claim 27, further comprising:
ascertaining at least one measured value of a fluid temperature, a temperature of the fluid, fluid held in a supply container or guided in the fluid supply line.

45. The method as claimed in claim 43, further comprising:
comparing at least one of the measured values of the operating temperature of the transducer apparatus with the at least one measured value of the fluid temperature, ascertained while allowing fluid to flow along the first flow path;
the opening of the second flow path occurs only after, by comparing the at least one of the measured values of the operating temperature of the transducer apparatus with the at least one measured value of the fluid temperature, it is ascertained that a temperature difference existing between the operating temperature of the transducer apparatus and the fluid temperature lies within a predetermined tolerance range, a tolerance range representing steady thermal equilibrium state of the transducer apparatus.

46. The method as claimed in claim 27, wherein:
the transducer apparatus further comprises: at least one oscillation exciter for exciting, especially differentially exciting, and maintaining mechanical oscillations of the first tube and/or second tube, especially mechanical oscillations both of the first tube and also of the second tube.

47. The method as claimed in claim 46, further comprising:
using the at least one oscillation exciter for exciting and maintaining mechanical oscillations of the first tube and/or second tube, especially mechanical oscillations both of the first tube and also of the second tube.

48. The method as claimed in claim 27, wherein:
the transducer apparatus is a component of a vibronic measuring device, a Coriolis mass flow measuring device, a density measuring device or viscosity measuring device; and/or
the at least one measured variable is a mass flow rate of the fluid allowed to flow through the measuring system or a measured variable derived therefrom, a total mass of the fluid allowed to flow during a predetermined time interval through the transducer system and/or along the second flow path; and/or
the transducer apparatus further comprises: at least one oscillation sensor for registering oscillatory movements of the first tube and/or second tube, for the differential registering of oscillatory movements of both the first tube and also the second tube and for generating a sensor signal serving as a measurement signal, or basis for the measurement signal.

49. The method as claimed in claim 27, further comprising:
using the at least one measurement signal for ascertaining measured values of the at least one other (second) measured variable differing from the at least one (first) measured variable, in such a manner that a sequence of the measured values represents the additional measured variable of the fluid flowing along the first flow path as a function of time and/or that a sequence of the measured values represents the additional measured variable of the fluid flowing along the second flow path as a function of time.

50. The method as claimed in claim 49, wherein:
the at least one additional measured variable is a density of the fluid.

51. The method as claimed in claim 27, wherein:
at least the fluid allowed to flow through the second flow path contains methane and/or ethane and/or propane and/or butane; and/or
at least the fluid allowed to flow through the second flow path is a liquefied gas, especially a methane, ethane, propane and/or butane containing, liquefied gas and/or a liquefied natural gas (LNG); and/or
the fluid allowed to flow through the second flow path corresponds to the fluid allowed to flow through the first flow path; and/or
the fluid allowed to flow through the second flow path (II) has a temperature, which equals a temperature of the fluid allowed to flow through the first flow path; and/or
the fluid has, at least at times, both during flow through the first flow path as well as also during flow through the second flow path, a temperature of less than −40° C.; and/or the fluid has, at least at times, especially both during flow through the first flow path as well as also during flow through the second flow path, a temperature of greater than 100° C.; and/or fluid allowed to flow through the second flow path has, at least at times, a temperature, which equals a temperature of the fluid allowed to flow through the first flow path.

52. The method as claimed in claim 27, wherein:

the measuring system further comprises: a withdrawal container arranged downstream of the fluid withdrawal line, a mobile withdrawal container and/or a withdrawal container temporarily connected to the fluid withdrawal line.

53. The method as claimed in claim 52, wherein:

the opening of the second flow path includes a connecting of the withdrawal container to the fluid withdrawal line, in such a manner that the second flow path leads from the lumen of the fluid withdrawal line further to a lumen of the withdrawal container.

54. The method as claimed in claim 27, further comprising:

using the at least one measurement signal and/or at least a portion of the measured values of the at least one measured variable for ascertaining an amount, a mass and/or a volume of the fluid allowed to flow through the second flow path, measured values representing a total fluid allowed to flow during a predetermined time interval, in such a manner that a sequence of the measured values represents the amount of the fluid allowed to flow through the second flow path as a function of time.

55. The method as claimed in claim 54, further comprising:

comparing with a predetermined threshold value at least one measured value, a plurality of measured values, representing an amount of fluid flowing through the second flow path.

56. The method as claimed in claim 55, further comprising:

interrupting the second flow path, in case an exceeding of the threshold value by at least one of the measured values representing an amount of fluid allowed to flow through the second flow path is detected.

57. The method as claimed in claim 27, wherein:

the measuring system is a component of a transfer location, a transfer location for traffic in goods where certification is obligatory, which is adapted to transfer fluid into a withdrawal container arranged downstream of the fluid withdrawal line, a mobile withdrawal container and/or a withdrawal container temporarily connected to the fluid withdrawal line, a predetermined or predeterminable amount of the fluid, especially fluid held in a supply container and/or having a fluid temperature of less than −40° C.

\* \* \* \* \*